(12) United States Patent  
Naito et al.

(10) Patent No.: US 8,846,260 B2  
(45) Date of Patent: Sep. 30, 2014

(54) FUEL CELL STACK

(75) Inventors: Hideharu Naito, Utsunomiya (JP);  
Norihisa Kobayashi, Shioya-gun (JP);  
Ryoichi Yoshitomi, Utsunomiya (JP);  
Masaaki Sakano, Utsunomiya (JP);  
Keisuke Suda, Utsunomiya (JP);  
Yasuhiro Watanabe, Kawaguchi (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 12/794,416

(22) Filed: Jun. 4, 2010

(65) Prior Publication Data

US 2010/0310958 A1    Dec. 9, 2010

(30) Foreign Application Priority Data

Jun. 4, 2009 (JP) ................. 2009-134577  
Aug. 5, 2009 (JP) ................. 2009-182516  
Aug. 7, 2009 (JP) ................. 2009-184601  
Apr. 27, 2010 (JP) ................. 2010-102377

(51) Int. Cl.  
*H01M 8/04* (2006.01)  
*H01M 8/02* (2006.01)  
*H01M 8/10* (2006.01)

(52) U.S. Cl.  
CPC .. *H01M 8/04029* (2013.01); *H01M 2008/1095* (2013.01); *H01M 8/0258* (2013.01); *Y02E 60/50* (2013.01); *H01M 8/04074* (2013.01)  
USPC ............................ 429/434; 429/433; 429/452

(58) Field of Classification Search  
USPC ................................................. 429/400–535  
See application file for complete search history.

(56) References Cited

U.S. PATENT DOCUMENTS

2006/0088740 A1* 4/2006 Sakano et al. .................. 429/12  
2008/0166621 A1* 7/2008 Sano et al. ...................... 429/34

FOREIGN PATENT DOCUMENTS

| JP | 2000-260439 | 9/2000 |
| JP | 2002-83610 | 3/2002 |
| JP | 2004-247258 | 9/2004 |
| JP | 2007-141551 | 6/2007 |
| JP | 2008-181783 | 8/2008 |
| JP | 2009-64643 | 3/2009 |

OTHER PUBLICATIONS

Japanese Office Action for Application No. 2010-102377, dated Aug. 30, 2011.  
Japanese Office Action for Application No. 2009-182516, 9 pages, dated Oct. 29, 2013.

* cited by examiner

*Primary Examiner* — Kenneth Douyette  
*Assistant Examiner* — James Lee  
(74) *Attorney, Agent, or Firm* — Nelson Mullins Riley & Scarborough LLP; Anthony A. Laurentano

(57) ABSTRACT

Coolant supply passages and coolant discharge passages, for example, two respectively thereof, are disposed on upper and lower side portions of a first end plate of a fuel cell stack. Grooves are formed on a surface of the first end plate for establishing communication between each of the coolant supply passages and the coolant discharge passages. Air, which is introduced upwardly of the coolant discharge passages, is discharged to the coolant supply passages.

11 Claims, 20 Drawing Sheets

⇒ OXYGEN-CONTAINING GAS
⇒ COOLANT
⇒ FUEL GAS

⇒ OXYGEN-CONTAINING GAS
⇒ COOLANT
⇒ FUEL GAS ered into the coolant passages to be easily and reliably discharged to the exterior, and which can prevent retention of air in the interior of the fuel cell as much as possible.

FUEL CELL STACK

CROSS-REFERENCE TO RELATED APPLICATION

This application is based upon and claims the benefit of priority from Japanese Patent Applications No. 2009-134577 filed on Jun. 4, 2009, No. 2009-182516 filed on Aug. 5, 2009, No. 2009-184601 filed on Aug. 7, 2009 and No. 2010-102377 filed on Apr. 27, 2010, of which the contents are incorporated herein by reference.

BACKGROUND OF THE INVENTION

1. Field of the Invention

The present invention relates to a fuel cell stack in which electrolyte electrode assemblies and separators are stacked in a horizontal direction. Each of the electrolyte electrode assemblies includes a pair of electrodes and an electrolyte interposed between the electrodes.

2. Description of the Related Art

For example, a solid polymer electrolyte fuel cell employs an electrolyte membrane (electrolyte). The electrolyte membrane is a polymer ion exchange membrane. The electrolyte membrane is interposed between an anode and a cathode to form a membrane electrode assembly (MEA). The membrane electrode assembly is sandwiched between a pair of separators to form a unit cell for generating electricity. The fuel cell normally is used in the form of a fuel cell stack, by stacking a predetermined number of unit cells.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators.

Furthermore, it is frequently the case that in the interior of the fuel cell, there are provided a fuel gas supply passage and a fuel gas discharge passage through which the fuel gas flows, an oxygen-containing gas supply passage and an oxygen-containing gas discharge passage through which the oxygen-containing gas flows, and a coolant supply passage and a coolant discharge passage through which the coolant flows, each of which extends through the fuel cell in the stacking direction of the unit cells so as to provide a so-called internal manifold type of fuel cell.

As technology concerning internal manifold type fuel cells, Japanese Laid-Open Patent Publication 2000-260439 is known. Such a fuel cell, as shown in FIG. 19, includes a spacer 1 for assuring passage of the coolant. In a peripheral portion 2 of the spacer 1, passages 3 forming one reactant gas flow passage and passages 4 forming another reactant gas flow passage are provided in a vertical direction. On opposite sides in the vertical direction of the peripheral portion 2, respective pairs of passages 5 forming coolant passages are provided. The passages 5 communicate with a central coolant space 7 via connecting passages 6.

Incidentally, with such a fuel cell, during assembly thereof or when performing maintenance thereon, an operation is carried out in order to fill the coolant into the interior of the fuel cell. However, with the aforementioned spacer 1, at upper parts of each of the passages 5 disposed at lower portions on both sides of the peripheral portion 2, opening parts 8 exist, which are separated upwardly from the connecting passages 6. Consequently, it is easy for air to become trapped and retained in the opening parts 8, and such air cannot be extracted (i.e., vented).

Further, in Japanese Laid-Open Patent Publication 2000-260439, as shown in FIG. 20, a separator 1a made from stainless steel is provided, in which a flow field (grooves) 2a for the coolant is formed, for example, by adopting a corrugated (wavelike) plate structure therein.

Opposite ends of grooves 2a are connected via groove contacting portions 3a, whereby passages are assured which enable the coolant to traverse through the grooves 2a. At opposite edges of the separator 1a, passages 4a are formed, which make up coolant passages, and which constitute pathways for carrying out supply and discharge of the coolant.

Non-illustrated spacers are stacked on the separator 1a. Passages for guiding the coolant into the groove contacting portions 3a of the separator 1a are formed in a peripheral portion of the spacers.

However, after the coolant has been introduced into the groove contacting portions 3a from passages that are formed in the periphery of the spacers, the coolant is supplied in a straight line along the grooves 2a that communicate with the groove contacting portions 3a. Owing thereto, specialized spacers must be used. Such spacers increase the number of parts required from the fuel cell, the fuel cell overall has an increased dimension in the stacking direction, and costs for the fuel cell are increased.

SUMMARY OF THE INVENTION

The present invention has been made to solve the problems of this type, and an object of the present invention is to provide a fuel cell stack which enables air that has entered into the coolant passages to be easily and reliably discharged to the exterior, and which can prevent retention of air in the interior of the fuel cell as much as possible.

Another object of the present invention is to provide a fuel cell stack which, with an easily and economical structure, reliably cools the entire power generation surface, secures a favorable cross sectional area of the opening for the coolant passages, and enables the separator to be reduced in dimension in the short side (i.e., crosswise) direction of the separator.

The present invention relates to a fuel cell stack formed by stacking electrolyte electrode assemblies and separators in a horizontal direction, the electrolyte electrode assemblies each comprising a pair of electrodes and an electrolyte interposed between the electrodes.

The fuel cell stack comprises a plurality of coolant passages, which extend in the stacking direction and through which a coolant flows, disposed at upper and lower positions in side portions of the fuel cell stack, and a coolant passage connecting portion, which connects an upper one of the coolant passages with a lower one of the coolant passages.

Further, the fuel cell stack according to the present invention comprises a plurality of coolant passages, which extend in the stacking direction and through which a coolant flows, disposed at upper and lower positions in side portions of the fuel cell stack, a manifold communication passage which extends in the stacking direction and which communicates with an upper one of the coolant passages, and a coolant passage connecting portion, which connects the manifold communication passage and a lower one of the coolant passages, and which is disposed on at least an end plate arranged on one end in the stacking direction of the electrolyte electrode assemblies and the separators.

Further, the present invention relates to a fuel cell stack formed by stacking electrolyte electrode assemblies and rectangular separators, the electrolyte electrode assemblies each comprising a pair of electrodes and an electrolyte interposed between the electrodes, and a coolant flow field extending in a surface direction being formed between the rectangular separators.

The fuel cell stack comprises a pair of coolant supply passages which are formed respectively in lengthwise sides of the rectangular separators such that the coolant supply passages face each other in the surface direction, and a pair of coolant discharge passages, which are formed respectively in lengthwise sides of the rectangular separators such that the coolant discharge passages face each other in the surface direction. Together therewith, the coolant supply passages and the coolant discharge passages are constituted by rectangular openings which are elongate in the lengthwise direction of the rectangular separators, the rectangular openings including connecting passages disposed in portions adjacent short sides of the rectangular separators, the connecting passages connecting the openings with the coolant flow field.

According to the present invention, coolant passages are provided at upper and lower positions in side portions of the fuel cell stack, while in addition, the upper coolant passages and the lower coolant passages are connected via the coolant passage connecting portions. Owing thereto, air that is introduced to the lower coolant passages is capable of passing through the coolant passage connecting portions and being transferred to the upper coolant passages.

As a result thereof, air that is introduced to the coolant passages can easily and reliably be discharged to the exterior, and retention of air in the interior of the fuel cell can be prevented to the greatest extent possible.

Further, according to the present invention, in side portions of the fuel cell stack, a plurality of coolant passages which extend through the fuel cell stack in the stacking direction and through which a coolant flows are disposed at upper and lower positions, while a manifold communication passage extends in the stacking direction, communicating with upper ones of the coolant passages. Also, a coolant passage connecting portion is provided in an end plate arranged on one end in the stacking direction, the coolant passage connecting portion connecting the manifold communication passage and lower ones of the coolant passages. Accordingly, air that is introduced to the lower coolant passages can pass through the coolant passage connecting portion and be transferred to the side of the manifold communication passage.

As a result thereof, air that is introduced to the coolant passages can easily and reliably be discharged to the exterior, and retention of air in the interior of the fuel cell can be prevented to the greatest extent possible.

Furthermore, according to the present invention, in the coolant supply passages and the coolant discharge passages, connecting passages communicating with a coolant flow field are provided in portions adjacent the short sides of the rectangular separators. Owing thereto, the coolant can be supplied over the entire power generation surface, and by means of a simple and economical structure, the overall power generation surface can be cooled reliably.

Additionally, the coolant supply passages and the coolant discharge passages are formed across a region, which is greater than the range in which the connecting passages are formed. Accordingly, the cross sectional area of the openings of the coolant supply passages and the coolant discharge passages can be assured favorably, and pressure loss of the coolant can advantageously be reduced. Furthermore, because the coolant supply passages and the coolant discharge passages are constructed as rectangular openings with lengths thereof oriented in the long side direction, the length of the separators can easily be shortened in the short side direction.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
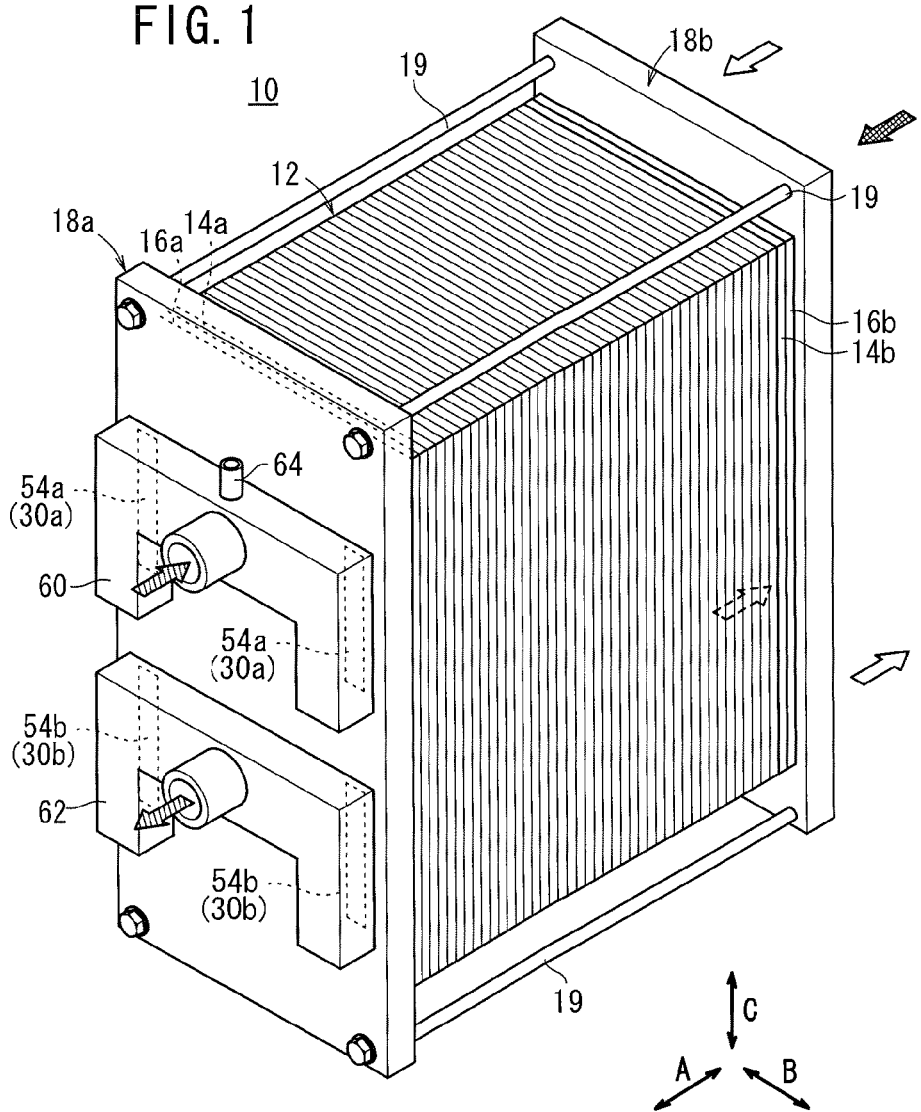
FIG. 1 is an outline perspective view of a fuel cell stack according to a first embodiment of the present invention.

As shown in FIG. 1, a fuel cell stack 10 according to a first embodiment of the present invention is constituted by fuel cells 12, a plurality of such fuel cells 12 being stacked mutually along a horizontal direction (in the direction of the arrow A).

On one end in the stacking direction of the fuel cells 12, a first terminal plate 14a, a first insulating plate 16a and a first end plate 18a are stacked thereon, whereas on the other end in the stacking direction, a second terminal plate 14b, a second insulating plate 16b and a second end plate 18b are stacked thereon.

The first end plate 18a and the second end plate 18b, which are constructed with rectangular shapes, are integrally fastened and retained by a plurality of tie rods 19 extending in the direction indicated by A. The fuel cell stack 10 may be retained integrally by a box shaped casing (not shown), which includes the first end plate 18a and the second end plate 18b serving as respective end plates thereof.

Figure 2:
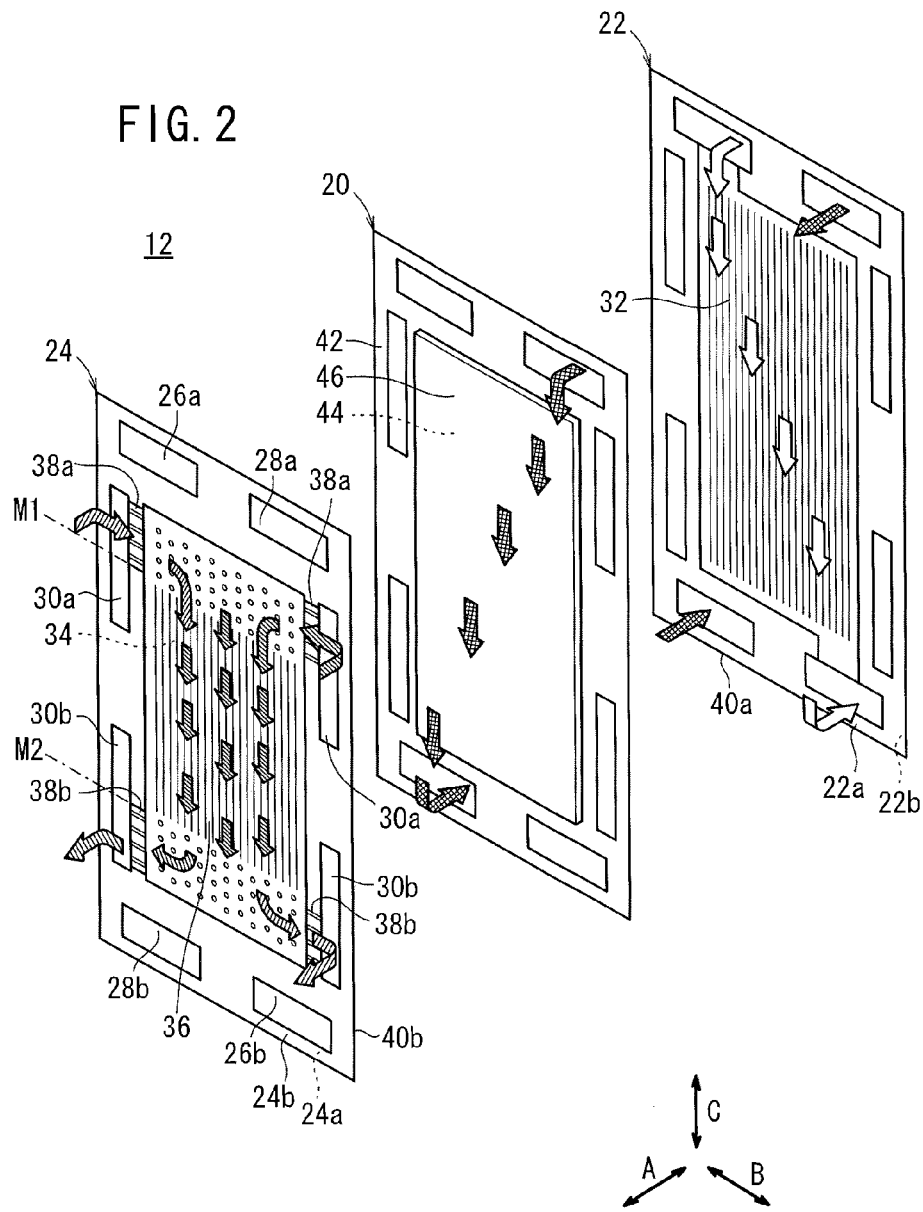
FIG. 2 is an exploded perspective view of a fuel cell of the fuel cell stack.

As shown in FIG. 2, each of the fuel cells 12 includes first and second separators 22, 24, and a membrane electrode assembly (electrolyte electrode assembly) 20, which is sandwiched between first and second separators 22, 24. The first and second separators 22, 24, in addition to carbon separators, may be constituted by metal separators, for example, steel plates, stainless steel plates, aluminum plates, or steel plates that have been subjected to a plating process, or the like. The first and second separators 22, 24 are constructed as rectangular separators, the long sides of which extend in the vertical direction (in the direction of the arrow C), for example.

On upper edge portions in the direction of the arrow C of the fuel cells 12 (in the direction of gravitational force in FIG. 2), an oxygen-containing gas supply passage 26a, which extends through the fuel cell in the direction of the arrow A (stacking direction) for supplying an oxygen-containing gas, and a fuel gas supply passage 28a, which extends through the fuel cells in the direction of the arrow A, for supplying a fuel gas, for example, a hydrogen containing gas, are disposed and arrayed in the direction of the arrow B (the horizontal direction).

On lower edge portions in the direction of the arrow C of the fuel cells 12, an oxygen-containing gas discharge passage 26b, which extends through the fuel cells in the direction of the arrow A for discharging the oxygen-containing gas, and a fuel gas discharge passage 28b, which extends through the fuel cells in the direction of the arrow A, for discharging the fuel gas, are disposed and arrayed in the direction of the arrow B.

On opposite edge portions in the direction of the arrow B of the fuel cell 12, coolant supply passages (coolant passages) 30a for supplying a coolant, and coolant discharge passages (coolant passages) 30b for discharging the coolant, for example, are disposed at respective upper and lower positions. The coolant supply passages 30a and the coolant discharge passages 30b are constructed with elongate rectangular openings oriented along the long side direction (the direction of the arrow C) of the first and second separators 22, 24.

On a surface 22a of the first separator 22 that confronts the membrane electrode assembly 20, an oxygen-containing gas flow field 32 is provided, which communicates with the oxygen-containing gas supply passage 26a and the oxygen-containing gas discharge passage 26b.

On a surface 24a of the second separator 24 that confronts the membrane electrode assembly 20, a fuel gas flow field 34 is provided, which communicates with the fuel gas supply passage 28a and the fuel gas discharge passage 28b.

Between the surface 22b of the first separator 22 and the surface 24b of the second separator 24 that constitute mutually adjacent fuel cells 12, a coolant flow field 36 is provided, which communicates with the coolant supply passages 30a and the coolant discharge passages 30b. Each of the coolant supply passages 30a and the coolant flow field 36 communicate via connecting passages 38a, and each of the coolant discharge passage 30b and the coolant flow field 36 communicate via connecting passages 38b. The coolant flow field 36 includes a plurality of straight line shaped or wavy shaped flow grooves, which extend in the direction of the arrow C. Also, on upper and lower (upstream and downstream) sides of the coolant flow field 36, buffering sections (embossed formations) are provided.

The connecting passages 38a are disposed adjacent to the upper side (on the short side of the first and second separators 22, 24) of the coolant supply passages 30a, whereas the connecting passages 38b are disposed adjacent to the lower side (on the short side of the first and second separators 22, 24) of the coolant discharge passages 30b. More specifically, each of the connecting passages 38a is disposed only within a range from an intermediate position M1 to an upper side end in the longitudinal direction of the coolant supply passage 30a, whereas each of the connecting passages 38b is disposed only within a range from an intermediate position M2 to a lower side end in the longitudinal direction of the coolant discharge passage 30b.

In the coolant supply passages 30a and the coolant discharge passages 30b, by setting the length dimension thereof in the direction of the arrow C, pressure loss of the coolant is decreased, whereby the output of a non-illustrated water pump can also be reduced. Furthermore, by setting the connecting passages 38a and 38b on the upper side of the coolant supply passages 30a and the lower side of the coolant discharge passages 30b, the coolant can be made to spread favorably over both upper and lower ends of the coolant flow field 36.

First sealing members 40a are disposed integrally or separately on surfaces 22a, 22b of the first separator 22, and second sealing members 40b are disposed integrally or separately on surfaces 24a, 24b of the second separator 24.

The membrane electrode assembly 20 includes a cathode 44 and an anode 46, a solid polymer electrolyte membrane (electrolyte) 42 interposed between the cathode 44 and the anode 46. The solid polymer electrolyte membrane 42 is formed by impregnating a thin membrane of perfluorosulfonic acid with water, for example.

Each of the cathode 44 and the anode 46 includes a gas diffusion layer such as carbon paper, and an electrode catalyst layer made up of a platinum alloy supported on porous carbon particles. The carbon particles are deposited uniformly on the surface of the gas diffusion layer. The electrode catalyst layers of the cathode 44 and the anode 46 are formed respectively to both surfaces of the solid polymer electrolyte membrane 42.

Figure 3:
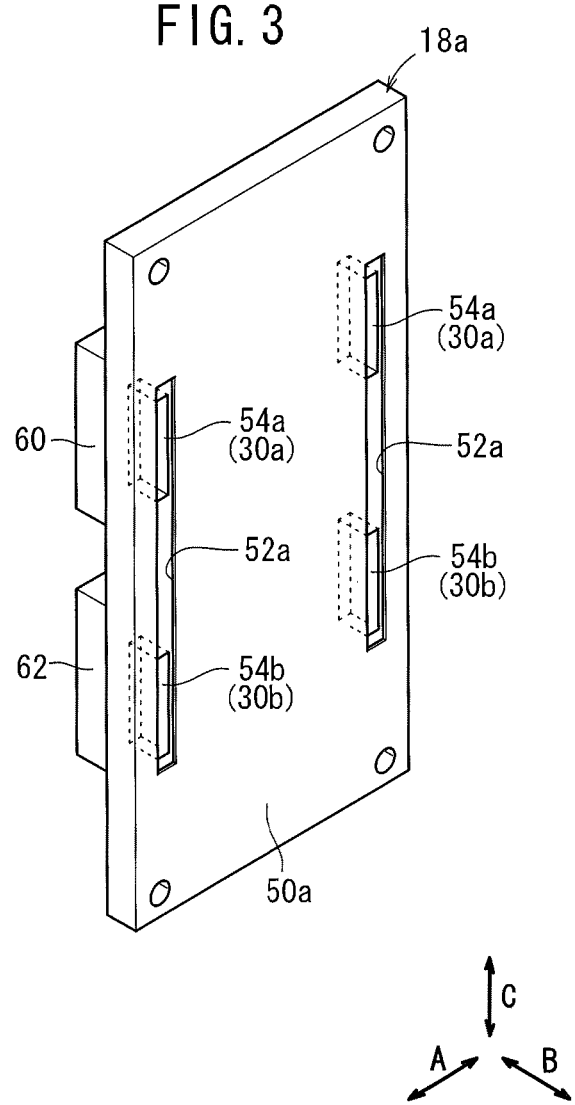
FIG. 3 is a perspective view of a first end plate of the fuel cell stack.

As shown in FIG. 3, grooves (coolant passage connecting portions) 52a, which establish communication between (i.e., interconnect) the coolant supply passages 30a and the coolant discharge passages 30b in the vertical direction, are formed at both right and left sides on the surface 50a of the first end plate 18a that faces the first insulating plate 16a.

Coolant inlet ports 54a that communicate with the coolant supply passages 30a, and coolant outlet ports 54b that communicate with the coolant discharge passages 30b are positioned respectively in each of the grooves 52a, and are formed to penetrate through the first end plate 18a.

Figure 4:
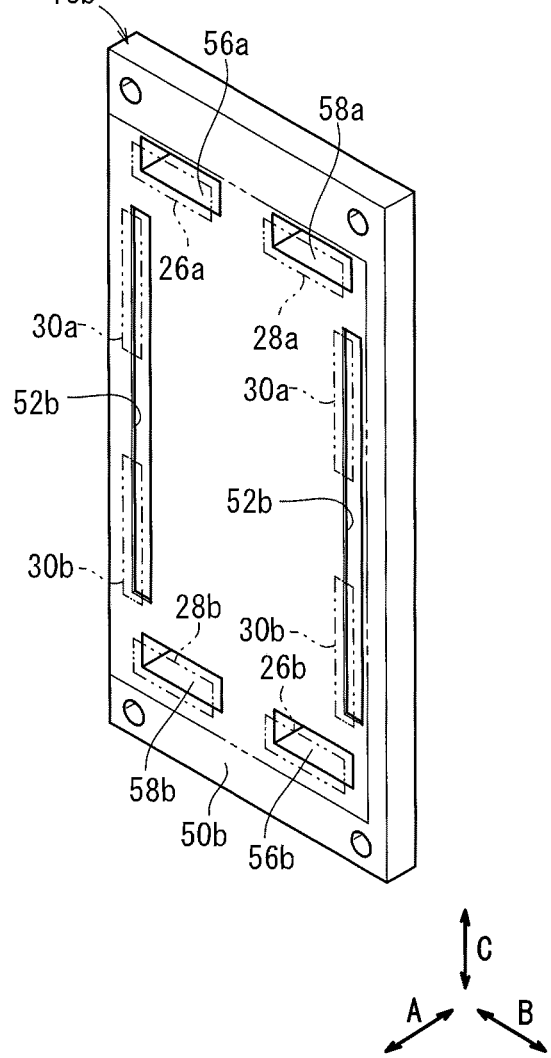
FIG. 4 is a perspective view of a second end plate of the fuel cell stack.

As shown in FIG. 4, grooves (coolant passage connecting portions) 52b, which establish communication between the coolant supply passages 30a and the coolant discharge passages 30b in the vertical direction, are formed at both right and left sides on the surface 50b of the second end plate 18b that faces the second insulating plate 16b.

An oxygen-containing gas inlet port 56a that communicates with the oxygen-containing gas supply passage 26a, and a fuel gas inlet port 58a that communicates with the fuel gas supply passage 28a are formed to penetrate through the upper portion of the second end plate 18b. An oxygen-containing gas outlet port 56b that communicates with the oxygen-containing gas discharge passage 26b, and a fuel gas outlet port 58b that communicates with the fuel gas discharge passage 28b are formed to penetrate through the lower side portion of the second end plate 18b.

As shown in FIG. 1, on the exterior side surface of the first end plate 18a, a supply manifold 60 is attached to an upper side of the first end plate 18a, whereas a discharge manifold 62 is attached to a lower side of the first end plate 18a.

The supply manifold 60 communicates with the pair of coolant inlet ports 54a, 54a of the first end plate 18a. Additionally, an air venting joint 64 is provided on an upper end side of the supply manifold 60. The discharge manifold 62 communicates with the pair of coolant outlet ports 54b, 54b of the first end plate 18a.

Although not shown, manifolds also are disposed respectively for the oxygen-containing gas inlet port 56a, the fuel gas inlet port 58a, the oxygen-containing gas outlet port 56b, and the fuel gas outlet port 58b in the second end plate 18b.

Operations of the fuel cell stack 10 will be described below.

First, from the oxygen-containing gas inlet port 56a of the second end plate 18b, an oxygen-containing gas is supplied to the oxygen-containing gas supply passage 26a. Together therewith, from the fuel gas inlet port 58a, a fuel gas such as a hydrogen containing gas is supplied to the fuel gas supply passage 28a.

Furthermore, as shown in FIG. 1, from the supply manifold 60, a coolant, such as pure water, ethylene glycol, oil or the like, is supplied to the coolant supply passages 30a, 30a via the coolant inlet ports 54a, 54a of the first end plate 18a.

As a result, as shown in FIG. 2, the oxygen-containing gas is introduced from the oxygen-containing gas supply passage 26a into the oxygen-containing gas flow field 32 of the first separator 22. The oxygen-containing gas moves in the direction of the arrow C (the direction of gravitational force) along the oxygen-containing gas flow field 32, and is supplied to the cathode 44 of the membrane electrode assembly 20.

On the other hand, the fuel gas is introduced from the fuel gas supply passage 28a into the fuel gas flow field 34 of the second separator 24. The fuel gas moves in the direction of the arrow C (the direction of gravitational force) along the fuel gas flow field 34, and is supplied to the anode 46 of the membrane electrode assembly 20.

Accordingly, at the membrane electrode assembly 20, the oxygen-containing gas supplied to the cathode 44 and the fuel gas supplied to the anode 46 are consumed in electrochemical reactions in electrode catalyst layers, for thereby generating electricity.

Then, the oxygen-containing gas supplied to and consumed at the cathode 44 of the membrane electrode assembly 20 is discharged in the direction of the arrow A along the oxygen-containing gas discharge passage 26b. Similarly, the fuel gas supplied to and consumed at the anode 46 of the membrane electrode assembly 20 is discharged in the direction of the arrow A along the fuel gas discharge passage 28b.

On the other hand, the coolant, which is supplied to the two coolant supply passages 30a, 30a, is introduced via the connecting passages 38a, 38a to the coolant flow field 36 formed between the first separator 22 and the second separator 24. The coolant moves in the direction of the arrow C, and after having cooled the membrane electrode assembly 20, passes through the connecting passages 38b, 38b and is discharged to the exterior from the two coolant discharge passages 30b, 30b via the discharge manifold 62.

In this case, with the fuel cell stack 10, an operation is carried out for filling the coolant during assembly of the fuel cell stack 10, or when maintenance is performed thereon. More specifically, from the discharge manifold 62, the coolant is injected into the fuel cell stack 10 by gravity. After having filled the coolant discharge passages 30b, 30b, the height of the coolant along each of the coolant flow field 36 rises, whereby the coolant supply passages 30a, 30a become filled, together with filling the supply manifold 60.

At this time, according to the first embodiment, on the surface 50a of the first end plate 18a and the surface 50b of the second end plate 18b, grooves 52a, 52b are formed respectively, which enable communication between the coolant supply passages 30a, 30a and the coolant discharge passages 30b, 30b (see FIGS. 3 and 4).

As a result, as shown in FIG. 2, in particular, air which is easily retained in the upper portion of the coolant discharge passages 30b, that is, upwardly of the connecting passages 38b, moves in the direction of the arrow A along the upper side of the coolant discharge passages 30b, and after being introduced into the grooves 52a or 52b, moves upwardly. This is because, during filling of the coolant, an operation is carried out that causes the fuel cell stack 10 to undergo oscillating movements in forward and backward directions.

Accordingly, air that has moved to the upper side of the grooves 52b is transferred toward the first end plate 18a along the coolant supply passages 30a, whereas air that has moved to the upper side of the grooves 52a is introduced to the interior of the supply manifold 60 from the coolant inlet ports 54a, which are provided on the upper side portion of the first end plate 18a. Upwardly of the supply manifold 60, the joint 64 is provided, and the air is discharged to the exterior from the joint 64.

As a result thereof, according to the first embodiment, air that has been introduced into the coolant discharge passages 30b, which are positioned on the lower side of the fuel cell stack 10, is capable of moving through the grooves 52a, 52b into the coolant supply passages 30a on the upper side of the fuel cell stack 10.

Owing thereto, air that has been introduced into the coolant discharge passages 30b can easily and reliably be discharged to the exterior, thereby enabling retention of such air inside the fuel cell 12 to be prevented to the greatest extent possible. Further, although in the first embodiment, respective grooves 52a, 52b are provided in both the first end plate 18a and the second end plate 18b, the invention is not limited by this feature, and for example, the grooves 52a may be provided only in the first end plate 18a.

Further, with the first embodiment, the coolant supply passages 30a and the coolant discharge passages 30b are constituted by long rectangular openings oriented in the lengthwise direction of the first and second separators 22, 24. In addition, each of the connecting passages 38a is disposed only within a range from an intermediate position M1 to an upper side end in the longitudinal direction of the coolant supply passage 30a, and each of the connecting passages 38b is disposed only within a range from an intermediate position M2 to a lower side end in the longitudinal direction of the coolant discharge passage 30b.

In this manner, by setting the connecting passages 38a and the connecting passages 38b at the upper side of the coolant supply passages 30a and at the lower side of the coolant discharge passages 30b, the coolant can advantageously spread across both upper and lower ends of the coolant flow field 36. Owing thereto, with a simple and economical structure, the overall power generation surface can be cooled reliably.

Furthermore, by setting the lengthwise dimension of the coolant supply passages 30a and the coolant discharge passages 30b along the direction of the arrow C, the opening cross sectional area thereof can advantageously be assured. Accordingly, pressure loss of the coolant can be decreased, and the output of a non-illustrated water pump can be reduced.

In addition, because the coolant supply passages 30a and the coolant discharge passages 30b are constituted by rectangular openings, the lengthwise dimension of which lies along the direction of the arrow C, the short side (widthwise) dimension of the first and second separators 22, 24 can be shortened.

Figure 5:
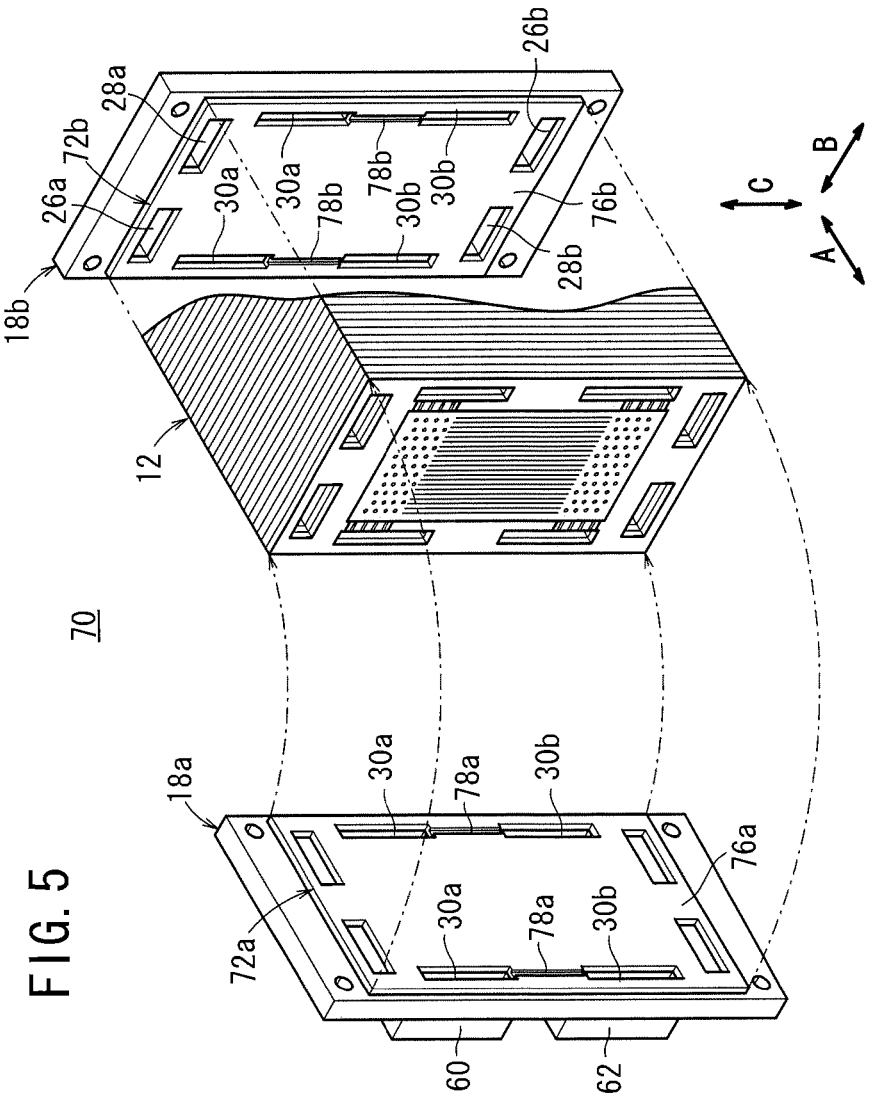
FIG. 5 is a perspective view with partial omission of a fuel cell stack according to a second embodiment of the present invention.

FIG. 5 is a perspective view with partial omission of a fuel cell stack 70 according to a second embodiment of the present invention.

Structural elements of the second embodiment, which are the same as those of the fuel cell stack 10 according to the first embodiment, are designated by like reference characters and such features shall not be described in detail. Similarly, in the description of the third embodiment or later that follows, detailed explanations of such features are omitted.

The fuel cell stack 70 is equipped with a first insulating plate 72a and a second insulating plate 72b. In the first insulating plate 72a, a pair of grooves (coolant passage connecting portions) 78a, 78a, which communicate in a vertical direction between the coolant supply passages 30a and the coolant discharge passages 30b, are formed in a surface 76a thereof facing the fuel cell 12.

Similarly, in a surface 76b of the second insulating plate 72b facing the fuel cell 12, a pair of grooves (coolant passage connecting portions) 78b, 78b are formed, which communicate in a vertical direction between the coolant supply passages 30a and the coolant discharge passages 30b.

Grooves 78a, 78b are provided in place of the grooves 52a disposed in the first end plate 18a and the grooves 52b disposed in the second end plate 18b according to the first embodiment. Accordingly, with the second embodiment, the same effects as those of the first embodiment are attained. Further, in the second embodiment, the grooves 78a may be provided only in the first insulating plate 72a.

Figure 6:
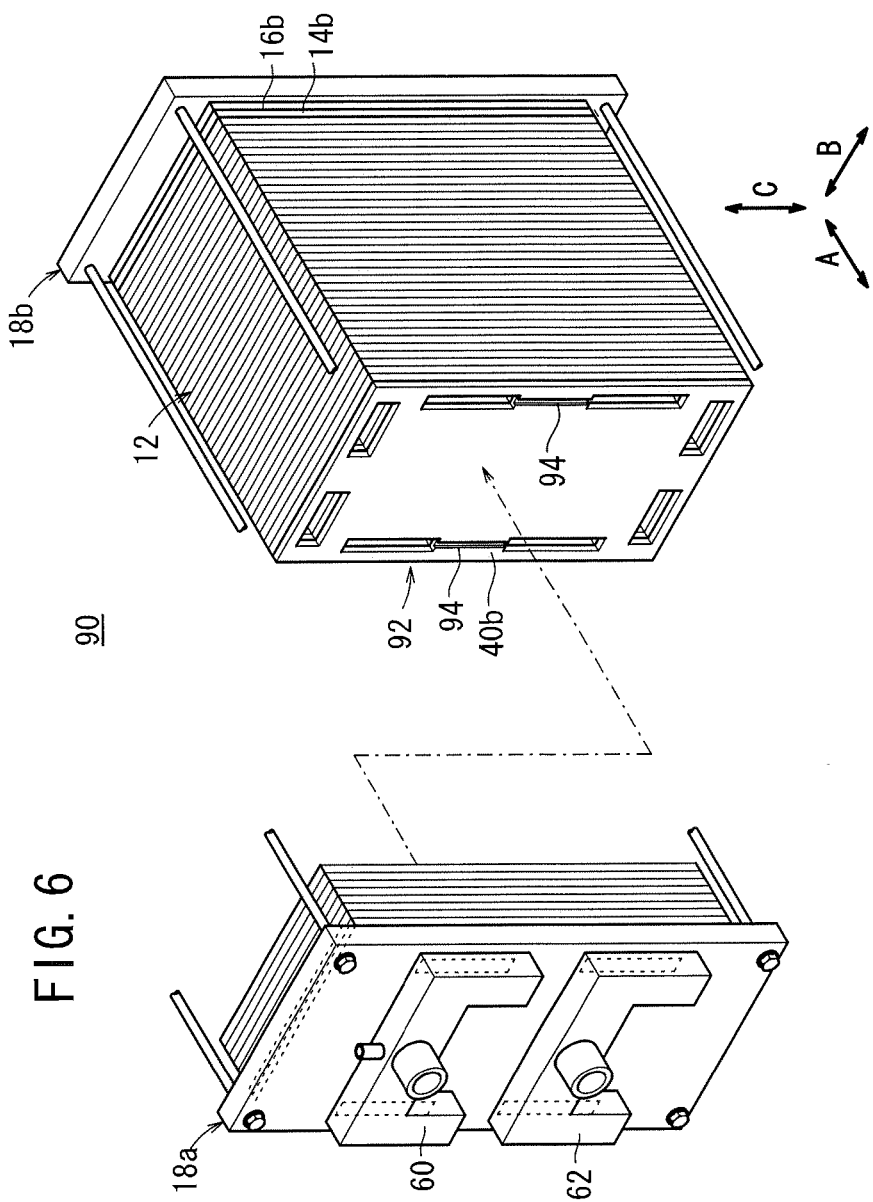
FIG. 6 is a perspective view with partial omission of a fuel cell stack according to a third embodiment of the present invention.

FIG. 6 is a perspective view with partial omission of a fuel cell stack 90 according to a third embodiment of the present invention.

The fuel cell stack 90 is equipped with at least one separator 92. The separator 92 is constructed substantially in the same manner as the first separator 22 or the second separator 24. For example, the second sealing member 40b provided in the second separator 24 is cut out to form grooves (coolant passage connecting portions) 94 that communicate vertically between the coolant supply passages 30a and the coolant discharge passages 30b. Consequently, with the third embodiment, the same effects as those of the first and second embodiments are attained.

Figure 7:
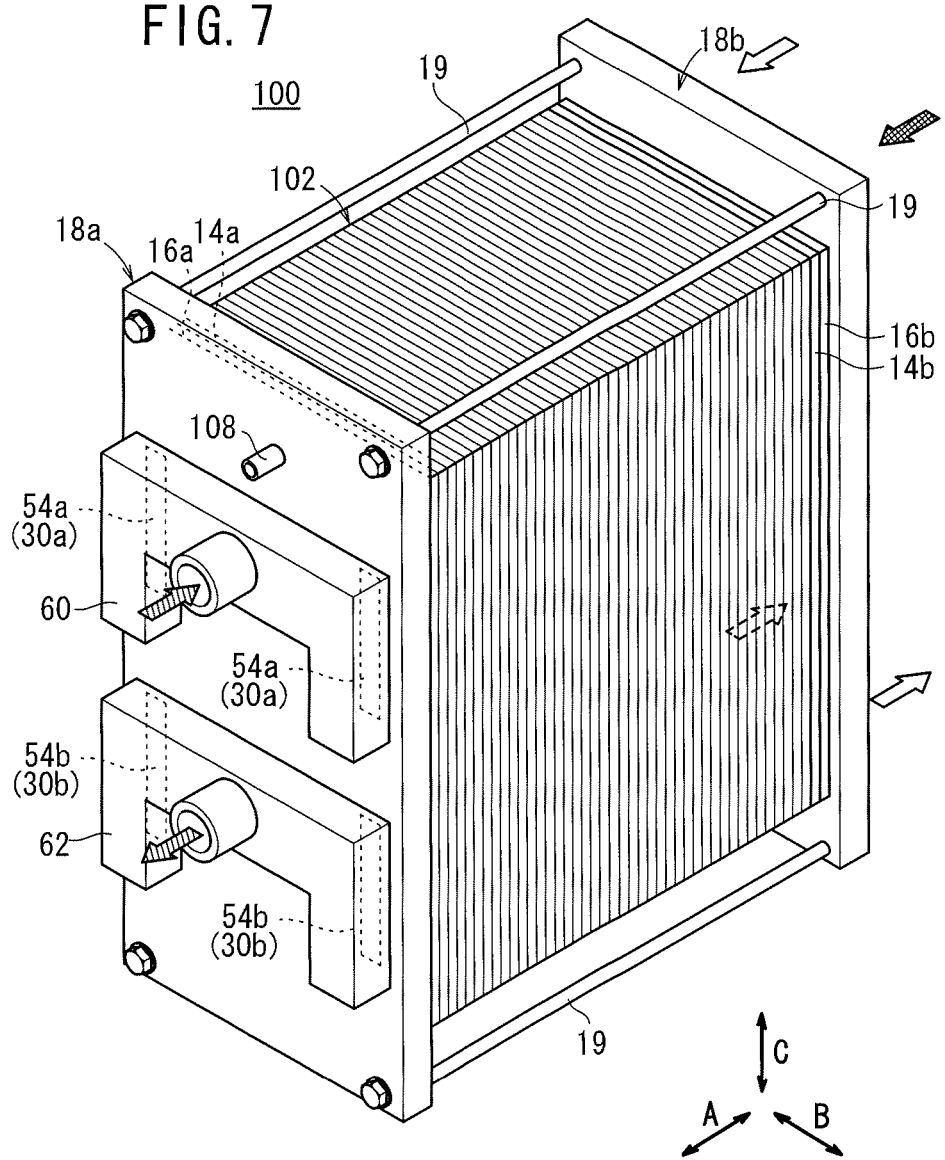
FIG. 7 is an outline perspective view of a fuel cell stack according to a fourth embodiment of the present invention.

FIG. 7 is an outline perspective view of a fuel cell stack 100 according to a fourth embodiment of the present invention.

Figure 8:
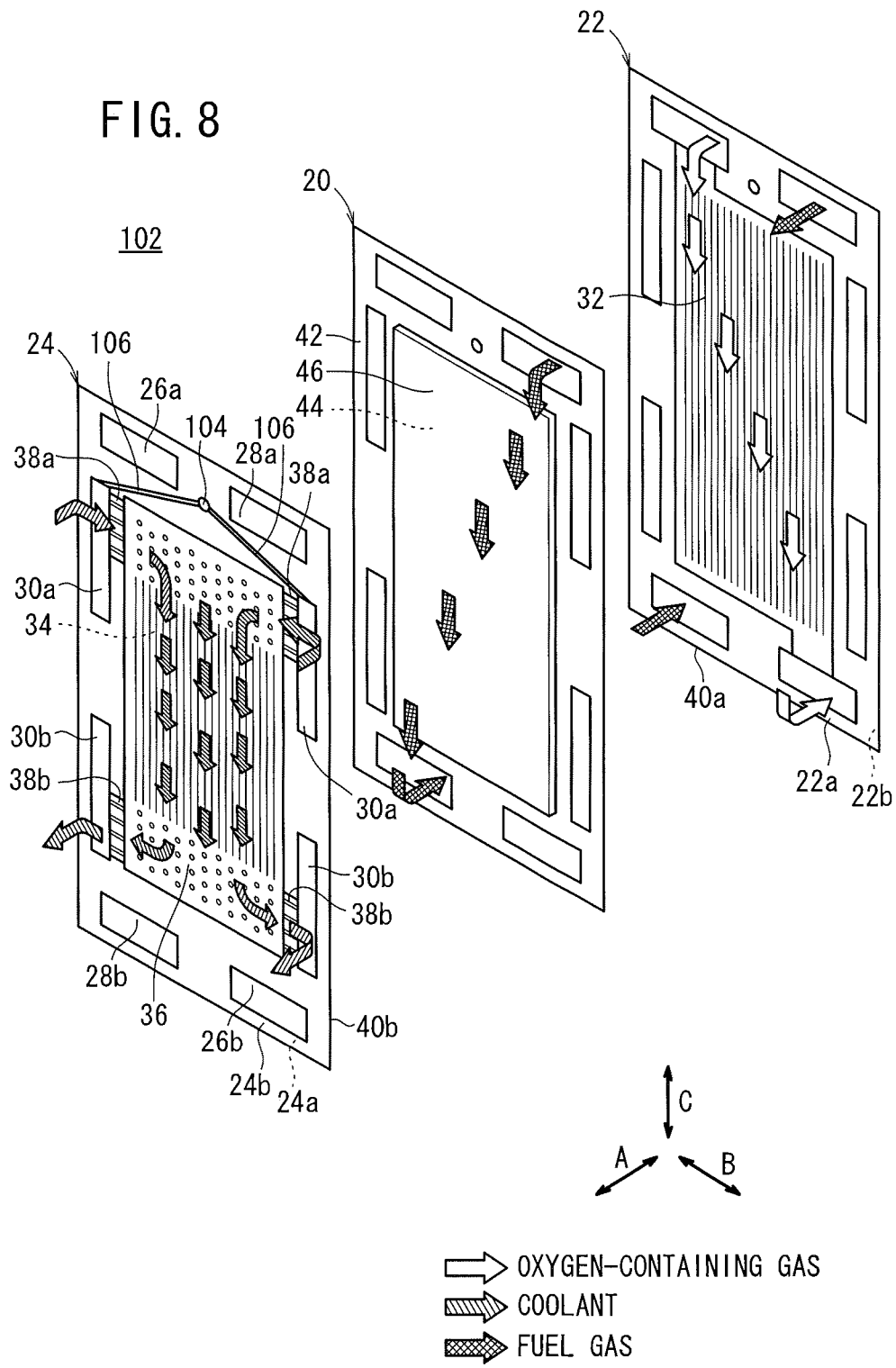
FIG. 8 is an exploded perspective view of a fuel cell of the fuel cell stack.

The fuel cell stack 100 is constructed by stacking a plurality of individual fuel cells 102. As shown in FIG. 8, on an upper side of each of the fuel cells 102, an air venting hole 104 is formed that penetrates in the stacking direction. Such an air venting hole 104 communicates with the coolant supply passages 30a, 30a through a pair of air passages 106, which are formed in a surface 24b of the second separator 24.

With the fourth embodiment, for example, any of the first end plate 18a and the second end plate 18b in which grooves 52a, 52b are provided of the first embodiment, the first insulating plate 72a and the second insulating plate 72b in which grooves 78a, 78b are provided of the second embodiment, or the separator 92 in which grooves 94 are provided of the third embodiment may be utilized.

Accordingly, with the fourth embodiment, air that has been introduced into an upper side portion of the coolant discharge passages 30b, after having moved to the side of the coolant supply passages 30a, is discharged to the venting holes 104 from the air passages 106. Furthermore, such air is discharged to the exterior from a joint member 108, which is disposed on the first end plate 18a. Consequently, the same effects as those of the first through third embodiments can be obtained.

Figure 9:
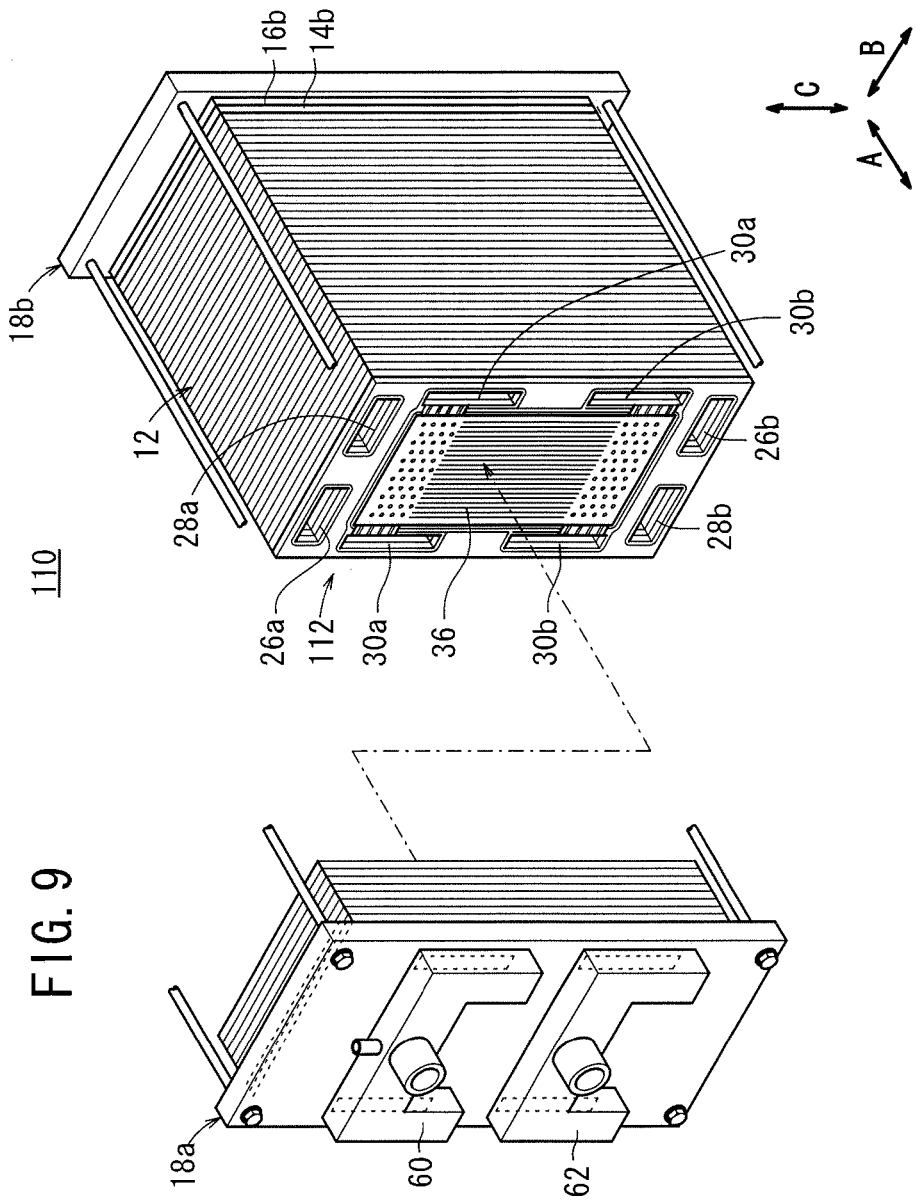
FIG. 9 is a perspective view with partial omission of a fuel cell stack according to a fifth embodiment of the present invention.

FIG. 9 is a perspective view with partial omission of a fuel cell stack 110 according to a fifth embodiment of the present invention.

Figure 10:
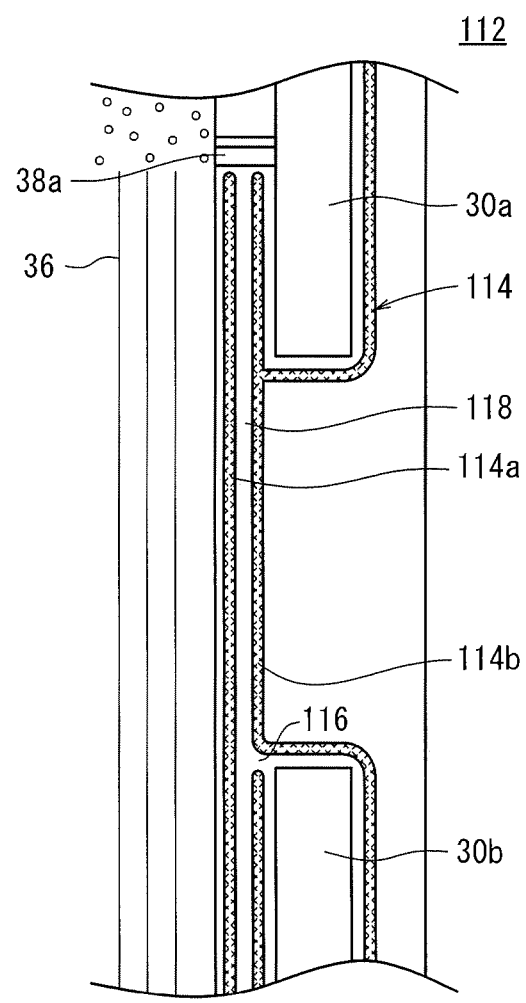
FIG. 10 is a partial enlarged explanatory view of a second separator of the fuel cell stack.

In at least one of the separators of the fuel cell stack 110, for example, the second separator 112, a second sealing member 114 is formed integrally therewith. As shown in FIG. 10, the second sealing member 114 is constituted by a double seal comprising an inner side sealing protrusion 114a and an outer side sealing protrusion 114b that surround the coolant flow field 36. On the outer side sealing protrusion 114b, a cutout region is provided in the vicinity of an upper end of the coolant discharge passage 30b, whereby a comparatively narrow gap 116 is formed.

The gap 116 communicates from above the coolant discharge passage 30b with a passage 118 formed between the inner side sealing protrusion 114a and the outer side sealing protrusion 114b, and the passage 118 communicates with the connecting passage 38a, which in turn communicates with the coolant supply passage 30a.

With the fifth embodiment, air that is easily retained in an upper portion of the coolant discharge passage 30b, after having been introduced into the passage 118 through the gap 116 from the upper side of the coolant discharge passage 30b, is transferred to the coolant supply passage 30a on the upper side. Accordingly, air that has been introduced into the coolant discharge passage 30b can easily and reliably be discharged to the exterior, thus achieving the same effects as those of the first through fourth embodiments.

Moreover, according to the fifth embodiment, although the second sealing member 114 is formed integrally on the second separator 112, the invention is not limited thereby. For example, the second sealing member 114 may also be constituted by a separately constructed gasket or the like.

Figure 11:
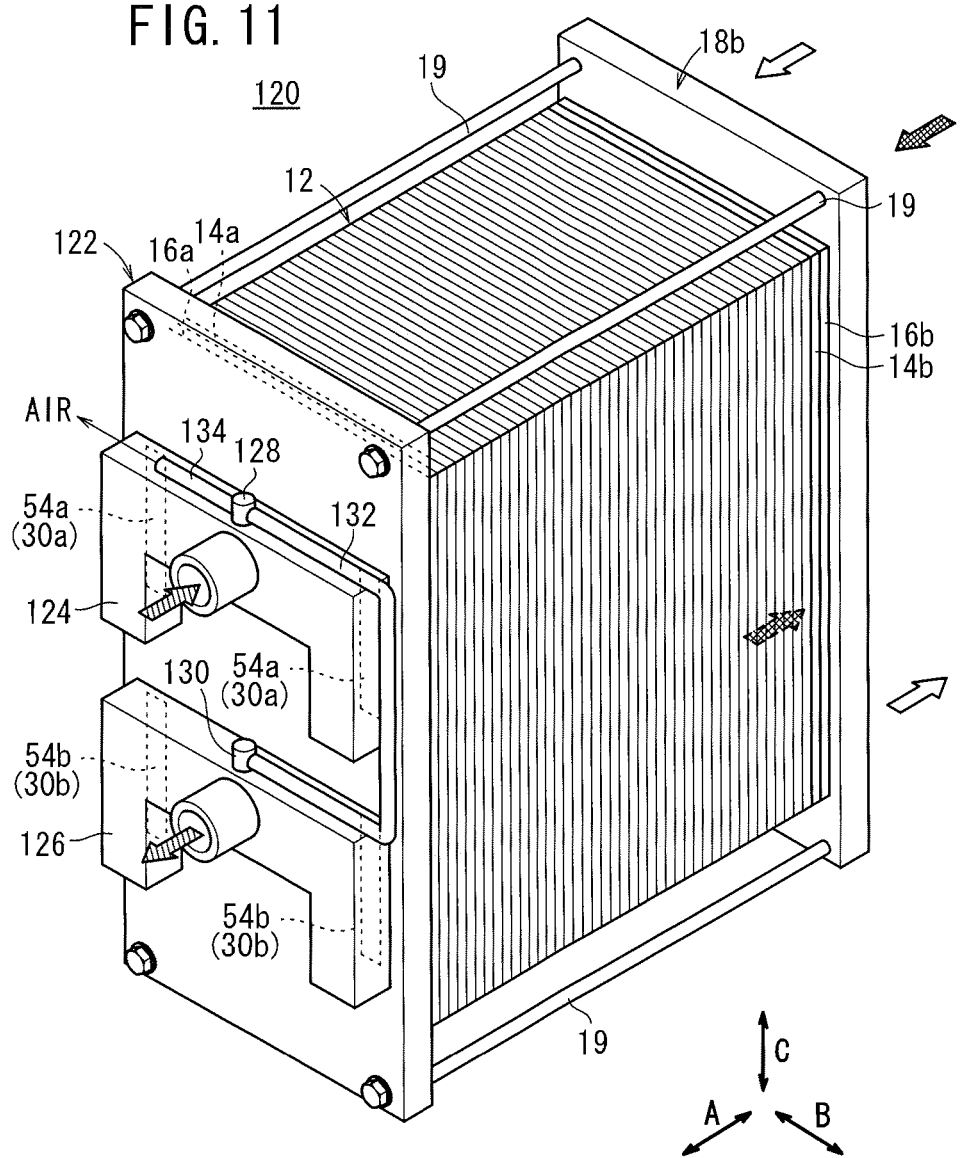
FIG. 11 is an outline perspective view of a fuel cell stack according to a sixth embodiment of the present invention.

FIG. 11 is an outline perspective view of a fuel cell stack 120 according to a sixth embodiment of the present invention.

The fuel cell stack 120 is equipped with a first end plate 122. On the first end plate 122, there are provided a supply manifold 124 and a discharge manifold 126. An air venting joint 128 that communicates with a pair of coolant inlet ports 54a, 54a is provided on an upper end side of the supply manifold 124, whereas another air venting joint 130 that communicates with a pair of coolant outlet ports 54b, 54b is provided on an upper end side of the discharge manifold 126.

The joints 128, 130 are connected via a piping member (coolant passage connecting portion) 132. An air venting pipe 134 is connected to the joint 128. Upper positions of the air venting pipe 134 and the piping member 132 are set at the same height, such that the joint 128 is disposed between the air venting pipe 134 and the piping member 132.

With the sixth embodiment, air that is easily retained in upper portions of the coolant discharge passages 30b, after having been introduced into the discharge manifold 126 through the coolant outlet port 54b of the first end plate 122, is transferred to the joint 130, which is disposed on the upper end side of the discharge manifold 126. Such air then is delivered from the joint 130 to the joint 128 of the supply manifold 124 through the piping member 132.

At the supply manifold 124, air that exists in the coolant supply passages 30a, after having been introduced into the supply manifold 124 from the coolant inlet port 54a of the first end plate 122, is collected in the joint 128. As a result, air that is introduced into the discharge manifold 126 and the supply manifold 124 is discharged to the exterior via the air venting pipe 134, one end of which is connected to the joint 128.

Consequently, with the sixth embodiment, the same effects as those of the first through fifth embodiments can be obtained. Additionally, the piping member 132 and the air venting pipe 134 sandwich the joint 128 therebetween while being arranged at the same height, so that the air venting process can be implemented swiftly and reliably.

Figure 12:
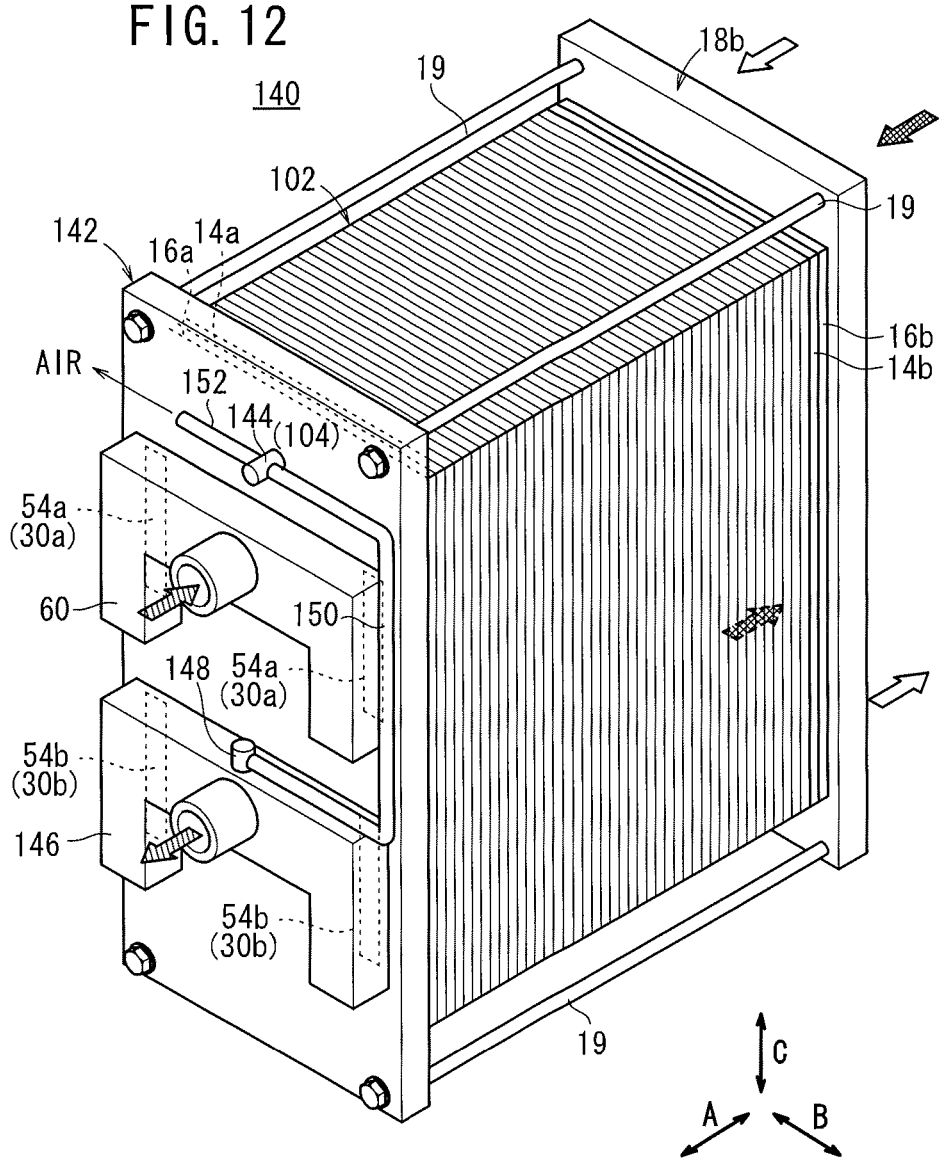
FIG. 12 is an outline perspective view of a fuel cell stack according to a seventh embodiment of the present invention.

FIG. 12 is an outline perspective view of a fuel cell stack 140 according to a seventh embodiment of the present invention.

Similar to the fuel cell stack 100 according to the fourth embodiment, the fuel cell stack 140 is equipped with a plurality of fuel cells 102, and a first end plate 142 is provided on one end in the stacking direction of the fuel cells 102. On an upper side of the first end plate 142, an air venting joint 144 is provided, which communicates with air venting holes (manifold communication passages) 104 disposed in each of the plurality of fuel cells 102.

A discharge manifold 146 is provided on the first end plate 142, and an air venting joint 148 is disposed on an upper end side of the discharge manifold 146. The joints 144, 148 are connected through a piping member (coolant passage connecting portion) 150, and one end of an air venting pipe 152 is connected to the joint 144. The piping member 150 and the air venting pipe 152 are arranged mutually at the same height, with the joint 144 being disposed between the air venting pipe 152 and the piping member 150.

With the seventh embodiment, on the outside of the first end plate 142, the piping member 150 is provided, which serves to interconnect the air venting holes 104 and the coolant outlet ports 54b. Consequently, the same effects as those of the first through sixth embodiments can be obtained.

Figure 13:
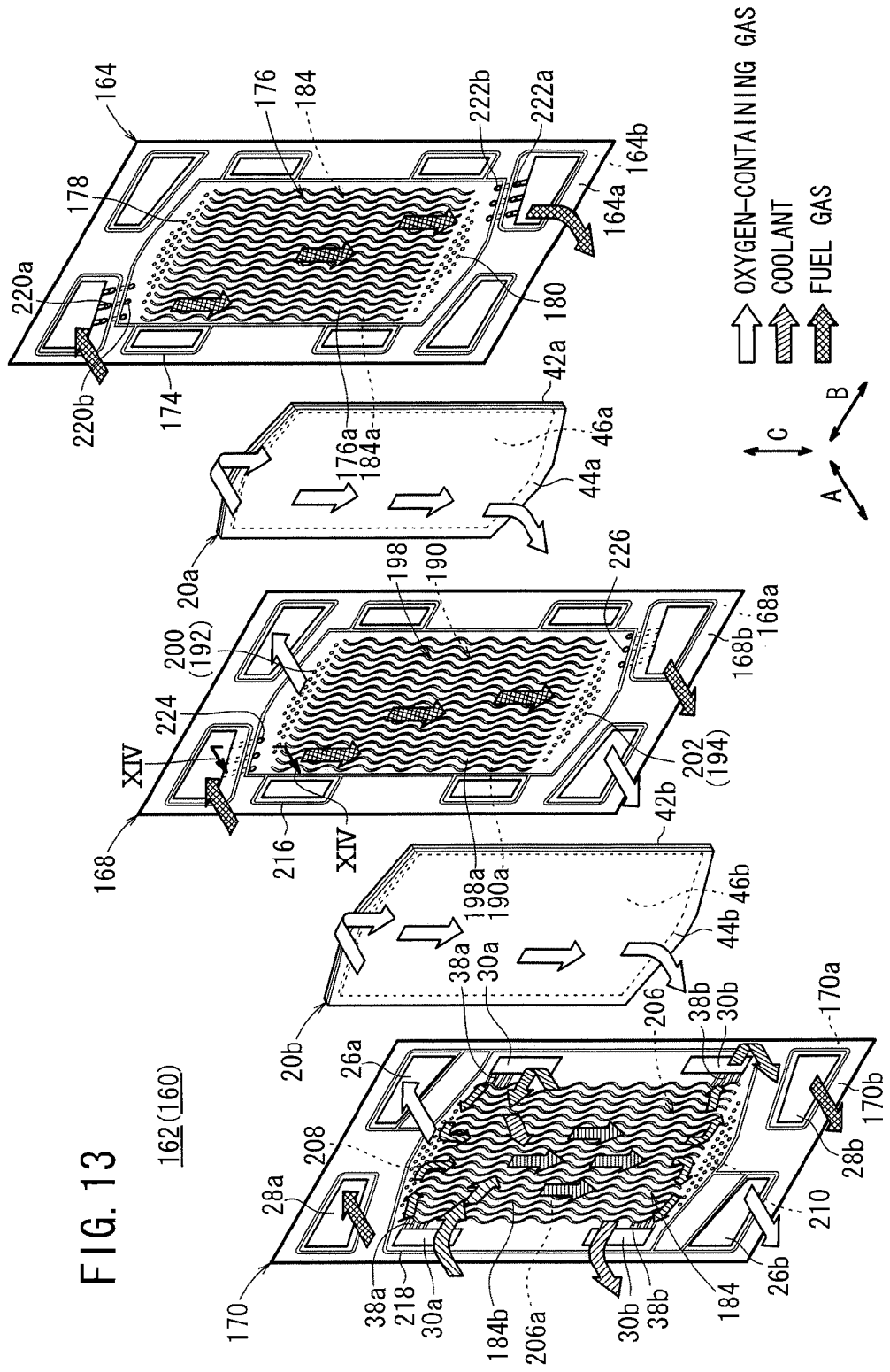
FIG. 13 is an exploded perspective view of main parts of a power generation unit of a fuel cell stack according to an eighth embodiment of the present invention.

FIG. 13 is an exploded perspective view of main parts of a power generation unit 162, constituting part of a fuel cell stack 160 according to an eighth embodiment of the present invention.

Figure 14:
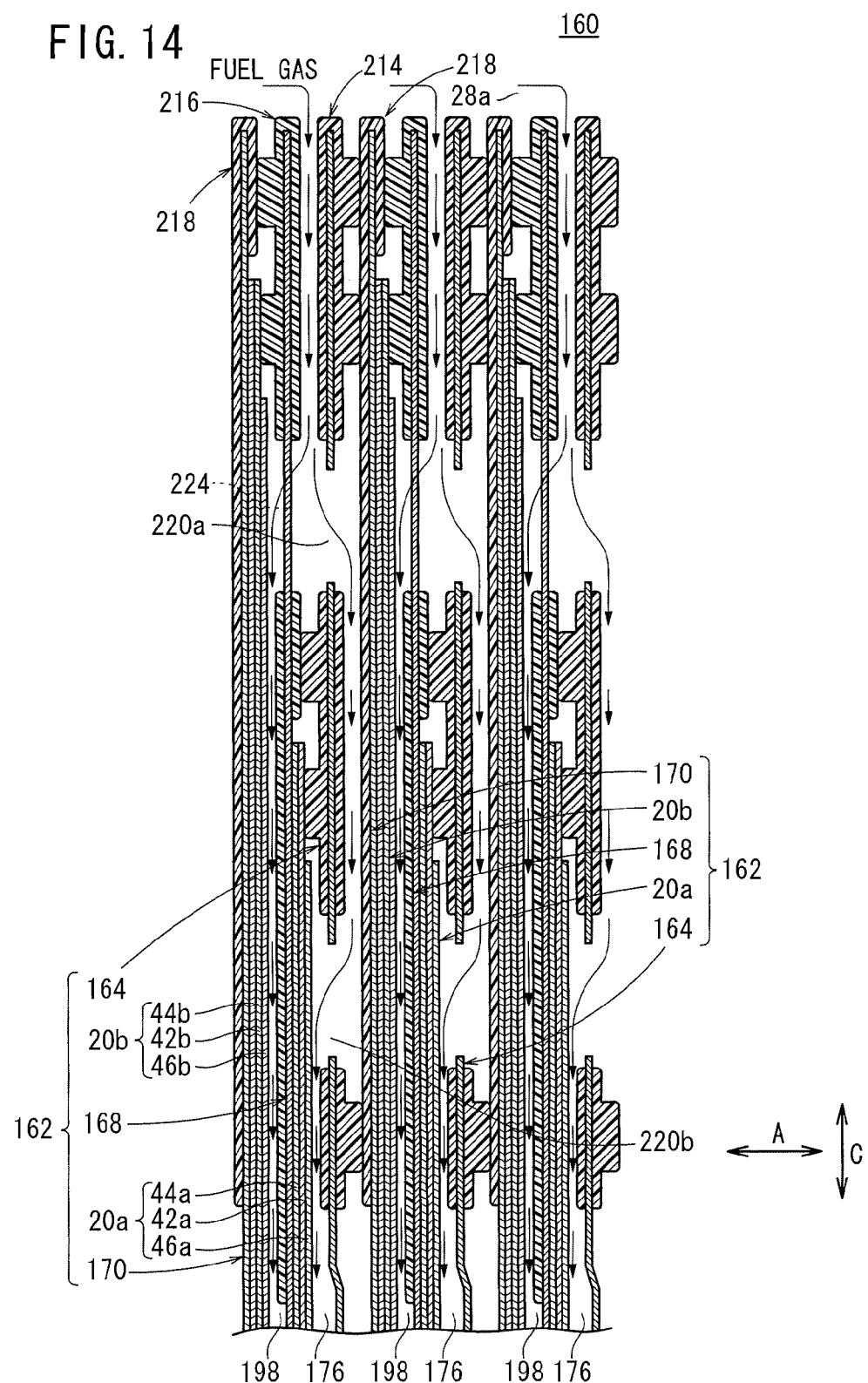
FIG. 14 is a cross sectional view of the fuel cell stack taken along line XIV-XIV in FIG. 13.

The fuel cell stack 160 is equipped with the power generation unit 162, and is constructed by stacking a plurality of such power generation units 162 mutually along a horizontal direction (in the direction of the arrow A). As shown in FIGS. 13 and 14, the power generation unit 162 comprises a first metal separator 164, a first membrane electrode assembly 20a, a second metal separator 168, a second membrane electrode assembly 20b, and a third metal separator 170.

The first metal separator 164, the second metal separator 168, and the third metal separator 170, are constructed by vertically long metal plates, such as, for example, steel plates, stainless steel plates, aluminum plates, steel plates that have been subjected to a plating process, or metal plates having their surfaces which have been subjected to surface processing to provide protection against corrosion. The first metal separator 164, the second metal separator 168, and the third metal separator 170 have rectangular planar shapes, and are formed by corrugating thin sheet metal by press-machining to have ridges and grooves.

The first membrane electrode assembly 20a is set to have a surface area smaller than that of the second membrane electrode assembly 20b. The first and second membrane electrode assemblies 20a, 20b comprise solid polymer electrolyte membranes 42a, 42b, together with anodes 46a, 46b and cathodes 44a, 44b, which sandwich the solid polymer electrolyte membranes 42a, 42b therebetween. The membrane electrode assemblies are constructed as a stepped-type MEA, in which the anodes 46a, 46b have smaller surface areas than the cathodes 44a, 44b.

Each of the coolant supply passages 30a, 30a is located proximate the oxygen-containing gas supply passage 26a and the fuel gas supply passage 28a, and the coolant supply passages 30a, 30a are allocated to respective opposite sides in the direction of the arrow B. Similarly, each of the coolant discharge passages 30b, 30b is located proximate the oxygen-containing gas discharge passage 26b and the fuel gas discharge passage 28b, and the coolant discharge passages 30b, 30b are allocated to respective opposite sides in the direction of the arrow B.

Figure 15:
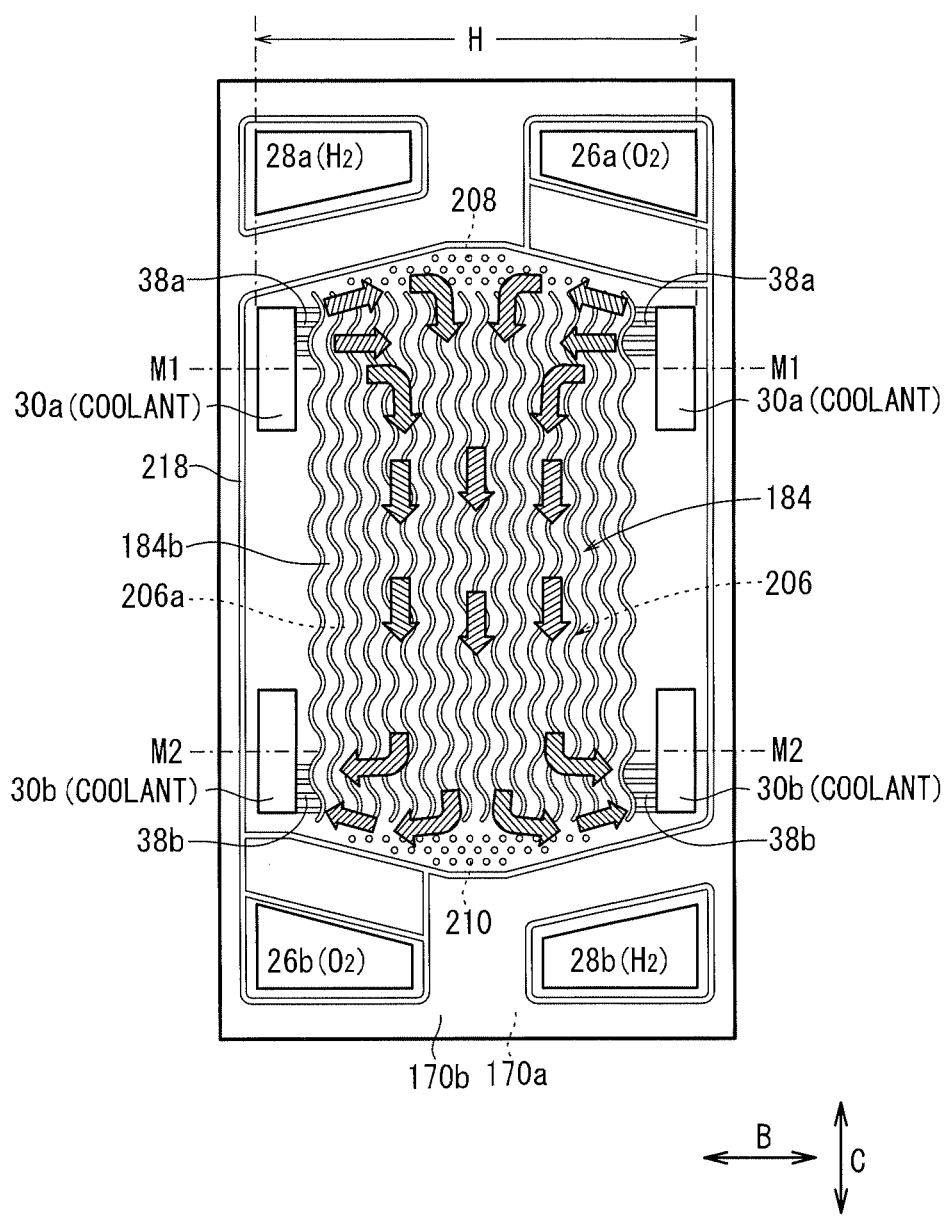
FIG. 15 is a front view of a third metal separator of the power generation unit.

As shown in FIG. 15, a distance H is set between the opening outer side edge of the oxygen-containing gas supply passage 26a and the opening outer side edge of the fuel gas supply passage 28a, and the distance H also is set between the opening outer side edge of the oxygen-containing gas discharge passage 26b and the opening outer side edge of the fuel gas discharge passage 28b. The pair of coolant supply passages 30a and the pair of coolant discharge passages 30b are allocated and arranged respectively within the aforementioned distance H.

Each of the connecting passages 38a is formed only within a range from an intermediate position M1 to an upper side end in the longitudinal direction of the coolant supply passage 30a, and each of the connecting passages 38b is formed only within a range from an intermediate position M2 to a lower side end in the longitudinal direction of the coolant discharge passage 30b.

As shown in FIG. 13, the first metal separator 164 has a first fuel gas flow field 176 on its surface 164a facing the first membrane electrode assembly 20a. The first fuel gas flow field 176 communicates between the fuel gas supply passage 28a and the fuel gas discharge passage 28b. The first fuel gas flow field 176 includes a plurality of corrugated flow grooves 176a extending in the direction of the arrow C. An inlet buffer 178 and an outlet buffer 180 each having bosses are provided adjacent to the inlet and the outlet of the first fuel gas flow field 176, respectively.

On the surface 164b of the first metal separator 164, a portion of the coolant flow field 184 is formed, which communicates between the coolant supply passages 30a and the coolant discharge passages 30b. Also on the surface 164b, a plurality of corrugated flow grooves 184a are formed, which are made up of the rear surface shape of the corrugated flow grooves 176a of the first fuel gas flow field 176.

The second metal separator 168 has a first oxygen-containing gas flow field 190 on its surface 168a confronting the first membrane electrode assembly 20a. The first oxygen-containing gas flow field 190 communicates between the oxygen-containing gas supply passage 26a and the oxygen-containing gas discharge passage 26b. The first oxygen-containing gas flow field 190 includes a plurality of corrugated flow grooves 190a that extend in the direction of the arrow C. In the vicinity of the inlet and in the vicinity of the outlet of the first oxygen-containing gas flow field 190, respectively, an inlet buffer 192 and an outlet buffer 194 are provided.

The second metal separator 168 has a second fuel gas flow field 198 on its surface 168b confronting the second membrane electrode assembly 20b. The second fuel gas flow field 198 communicates between the fuel gas supply passage 28a and the fuel gas discharge passage 28b. The second fuel gas flow field 198 includes a plurality of corrugated flow grooves 198a that extend in the direction of the arrow C. In the vicinity of the inlet and in the vicinity of the outlet of the second fuel gas flow field 198, respectively, an inlet buffer 200 and an outlet buffer 202 are provided. The second fuel gas flow field 198 is formed by the back surface shape of the first oxygen-containing gas flow field 190, whereas the inlet buffer 200 and the outlet buffer 202 are formed by the back surface shape of the inlet buffer 192 and the outlet buffer 194.

The third metal separator 170 has a second oxygen-containing gas flow field 206 on its surface 170a confronting the second membrane electrode assembly 20b. The second oxygen-containing gas flow field 206 communicates between the oxygen-containing gas supply passage 26a and the oxygen-containing gas discharge passage 26b. The second oxygen-containing gas flow field 206 includes a plurality of corrugated flow grooves 206a that extend in the direction of the arrow C. In the vicinity of the inlet and in the vicinity of the outlet of the second oxygen-containing gas flow field 206, respectively, an inlet buffer 208 and an outlet buffer 210 are provided.

On the surface 170b of the third metal separator 170, a portion of the coolant flow field 184 is formed. Also on the surface 170b, a plurality of corrugated flow grooves 184b are formed, which are made up of the rear surface shape of the flow grooves 206a of the second oxygen-containing gas flow field 206.

With the power generation unit 162, concerning the first fuel gas flow field 176 of the first metal separator 164, the first oxygen-containing gas flow field 190 of the second metal separator 168, and the second fuel gas flow field 198 of the second metal separator 168, the corrugated (wavelike) shapes thereof are set mutually at the same phase along the stacking direction. Together therewith, the wave pitch and amplitude thereof are set the same. Concerning the second oxygen-containing gas flow field 206 of the third metal separator 170, which is arranged at one end in the stacking direction (in the direction of the arrow A) of the power generation unit 162, the wavelike shapes thereof are set mutually at a different phase along the stacking direction from the first fuel gas flow field 176, the first oxygen-containing gas flow field 190, and the second fuel gas flow field 198, while the wave pitch and amplitude thereof are set the same.

As shown in FIGS. 13 and 14, a first sealing member 214 is formed integrally on surfaces 164a, 164b of the first metal separator 164, surrounding the outer circumferential end of the first metal separator 164. A second sealing member 216 is formed integrally on surfaces 168a, 168b of the second metal separator 168, surrounding the outer circumferential end of the second metal separator 168. Also, a third sealing member 218 is formed integrally on surfaces 170a, 170b of the third metal separator 170, surrounding the outer circumferential end of the third metal separator 170.

The first metal separator 164 includes a plurality of outer supply holes 220a and inner supply holes 220b that communicate between the fuel gas supply passage 28a and the first fuel gas flow field 176, and a plurality of outer discharge holes 222a and inner discharge holes 222b that communicate between the fuel gas discharge passage 28b and the first fuel gas flow field 176.

The second metal separator 168 includes a plurality of supply holes 224 that communicate between the fuel gas supply passage 28a and the second fuel gas flow field 198, and a plurality of discharge holes 226 that communicate between the fuel gas discharge passage 28b and the second fuel gas flow field 198.

The power generation units 162 themselves are stacked together mutually, whereby the coolant flow field 184 is formed and extend in the direction of the arrow B between the first metal separator 164 constituting one of the power generation units 162, and the third metal separator 170 constituting another one of the power generation units 162.

Figure 16:
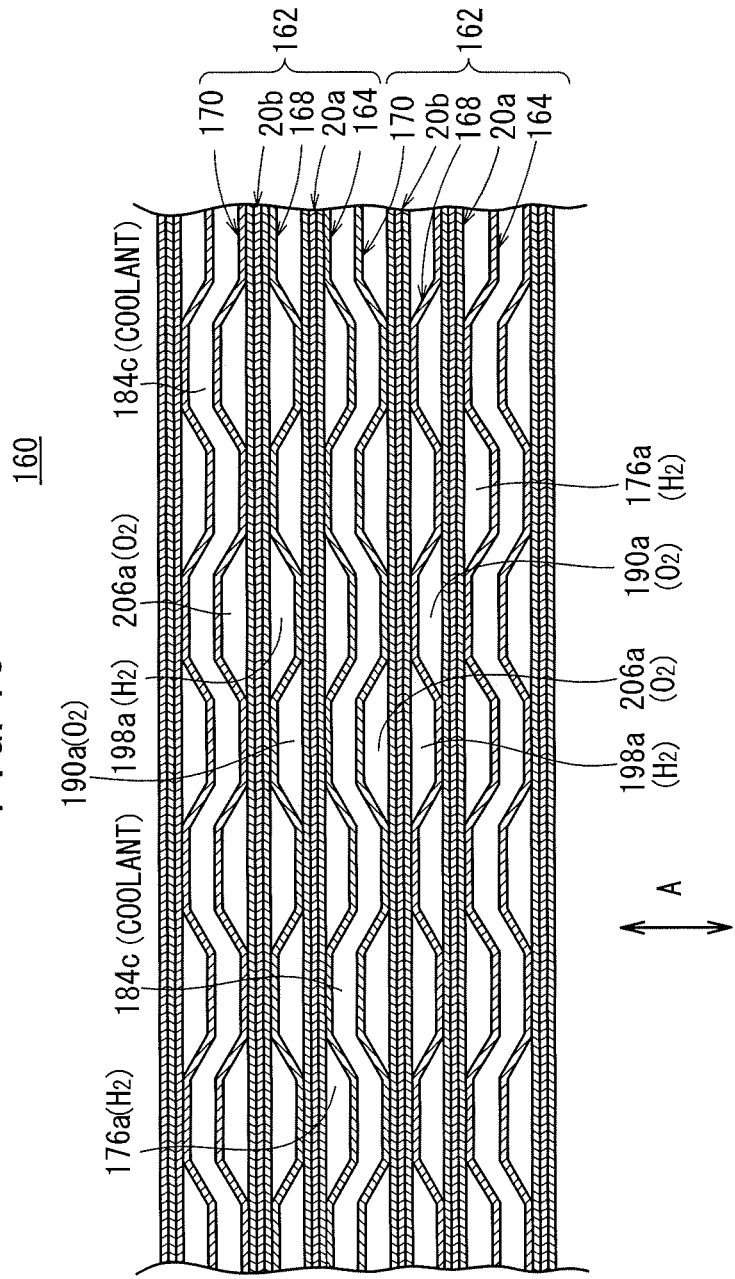
FIG. 16 is a partial cross sectional view of the fuel cell stack.
Figure 17:
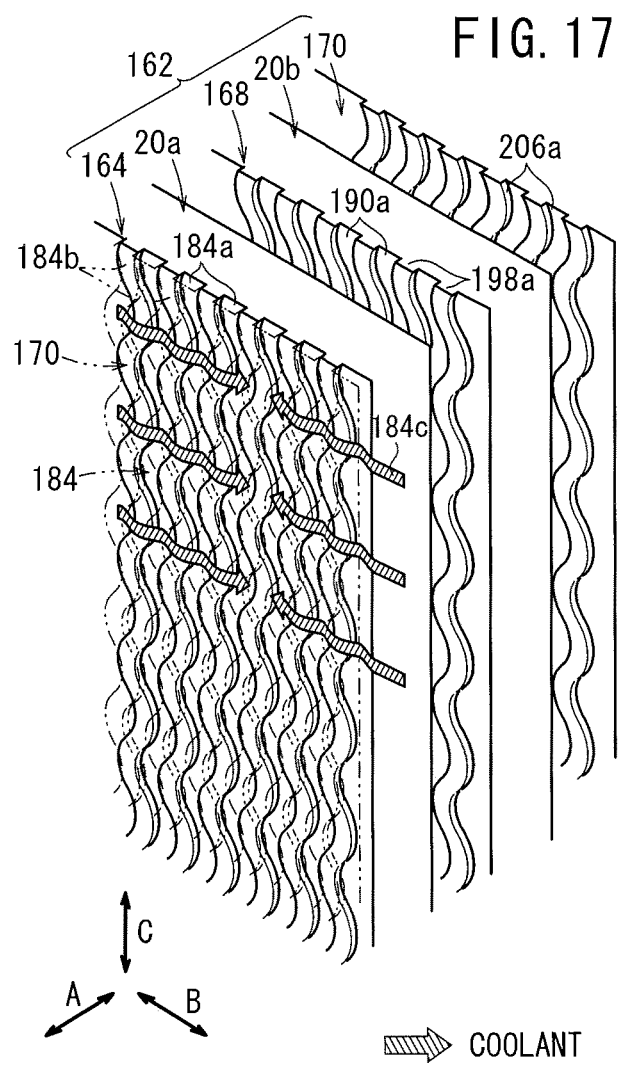
FIG. 17 is a perspective view with partial omission of a coolant flow field formed between the power generation units.

In the coolant flow field 184, the plural wave shaped flow grooves 184a and the plural wave shaped flow grooves 184b are set at different phases. By mutually overlapping the wave shaped flow grooves 184a, 184b, plural flow grooves 184c that communicate in a horizontal direction (in the direction of the arrow B) are formed therebetween (see FIGS. 16 and 17). The coolant flow field 184 extends across the buffer back surface shapes of the inlet buffer 178 and the outlet buffer 180, as well as the inlet buffer 208 and the outlet buffer 210, and are constructed to allow the coolant to flow therethrough.

Operations of the fuel cell stack 160 shall be described below.

First, as shown in FIG. 13, an oxygen-containing gas is supplied to the oxygen-containing gas supply passage 26a. Together therewith, a fuel gas is supplied to the fuel gas supply passage 28a. Furthermore, a coolant is supplied to the coolant supply passages 30a.

As a result, the oxygen-containing gas is introduced from the oxygen-containing gas supply passage 26a into the first oxygen-containing gas flow field 190 of the second metal separator 168, and into the second oxygen-containing gas flow field 206 of the third metal separator 170. The oxygen-containing gas moves in the direction of the arrow C (the direction of gravitational force) along the first oxygen-containing gas flow field 190, and is supplied to the cathode 44a of the first membrane electrode assembly 20a, and together therewith, the oxygen-containing gas moves in the direction of the arrow C along the second oxygen-containing gas flow field 206, and is supplied to the cathode 44b of the second membrane electrode assembly 20b.

On the other hand, as shown in FIG. 14, the fuel gas moves from the fuel gas supply passage 28a, through the outer supply holes 220a, and to the side of the surface 164b of the first metal separator 164. Furthermore, after having been introduced to the side of the surface 164a from the inner supply holes 220b, the fuel gas moves in the direction of gravitational force (in the direction of the arrow C) along the first fuel gas flow field 176, and is supplied to the anode 46a of the first membrane electrode assembly 20a (see FIG. 13).

Further, as shown in FIG. 14, the fuel gas passes through the supply holes 224 and moves to the side of the surface 168b of the second metal separator 168. As a result, as shown in FIG. 13, at the surface 168b, the fuel gas moves in the direction of the arrow C along the second fuel gas flow field 198 and is supplied to the anode 46b of the second membrane electrode assembly 20b.

Accordingly, at the first and second membrane electrode assemblies 20a, 20b, the oxygen-containing gas supplied to the cathodes 44a, 44b and the fuel gas supplied to the anodes 46a, 46b are consumed in electrochemical reactions in electrode catalyst layers, thereby generating electricity.

Then, the oxygen-containing gas supplied to and consumed at each of the cathodes 44a, 44b of the first and second membrane electrode assemblies 20a, 20b is discharged in the direction of the arrow A along the oxygen-containing gas discharge passage 26b.

The fuel gas supplied to and consumed at the anode 46a of the first membrane electrode assembly 20a passes through the inner discharge holes 222b and is directed to the side of the surface 164b of the first metal separator 164. The fuel gas, having been directed to the side of the surface 164b, passes through the outer discharge holes 222a and once again moves to the side of the surface 164a, where the fuel gas is discharged into the fuel gas discharge passage 28b.

Further, the fuel gas supplied to and consumed at the anode 46b of the second membrane electrode assembly 20b passes through the discharge hole 226 and moves to the side of the surface 168a, where the fuel gas is discharged into the fuel gas discharge passage 28b.

On the other hand, as shown in FIG. 15, the coolant supplied to the left and right pair of coolant supply passages 30a is delivered into the coolant flow field 184 formed between the first metal separator 164 constituting one of the power generation units 162, and the third metal separator 170 constituting another one of the power generation units 162.

The pair of coolant supply passages 30a are allocated to and disposed at positions adjacent the oxygen-containing gas supply passage 26a and the fuel gas supply passage 28a, at opposite left and right ends on the upper side of the power generation unit 162.

Owing thereto, the coolant, which is supplied to the coolant flow field 184 from each of the coolant supply passages 30a via the connecting passages 38a, is supplied in the direction of the arrow B and in directions in which the coolants from the coolant supply passages 30a approach each other. Such mutually approaching flows of the coolant collide at a central portion of the coolant flow field 184 in the direction of the arrow B, and after moving in the direction of gravitational force (in the downward direction of the arrow C), the coolant is discharged into each of the coolant discharge passages 30b, which are allocated to and disposed at opposite sides on the lower side of the power generation unit 162.

In this manner, according to the eighth embodiment, at the upper side of the power generation unit 162, left and right pairs of coolant supply passages 30a are provided, while at the lower side of the power generation unit 162, left and right pairs of coolant discharge passages 30b are provided. Accordingly, the coolant can move in a substantially vertical downward direction over the entire area of the coolant flow field 184. Consequently, it becomes possible to control the temperature distribution using a temperature gradient in the coolant flow field 184, whereby uniform cooling efficiency can be maintained, and the same effects as those of the first through fourth embodiments can be obtained.

Further, in the eighth embodiment, the oxygen-containing gas supply passage 26a and the fuel gas supply passage 28a are disposed at the upper edge portion of the power generation unit 162, and the oxygen-containing gas discharge passage 26b and the fuel gas discharge passage 28b are disposed at the lower edge portion of the power generation unit 162. However, conversely, the oxygen-containing gas discharge passage 26b and the fuel gas discharge passage 28b may be disposed at the upper edge portion, and the oxygen-containing gas supply passage 26a and the fuel gas supply passage 28a may be disposed at the lower edge portion.

Furthermore, the pair of coolant supply passages 30a is disposed at both upper edges in the short side direction of the power generation unit 162, and the pair of coolant discharge passages 30b is disposed at both lower edges in the short side direction of the power generation unit 162. However, conversely, the pair of coolant discharge passages 30b may be disposed at both upper edges, and the pair of coolant supply passages 30a may be disposed at both lower edges.

Figure 18:
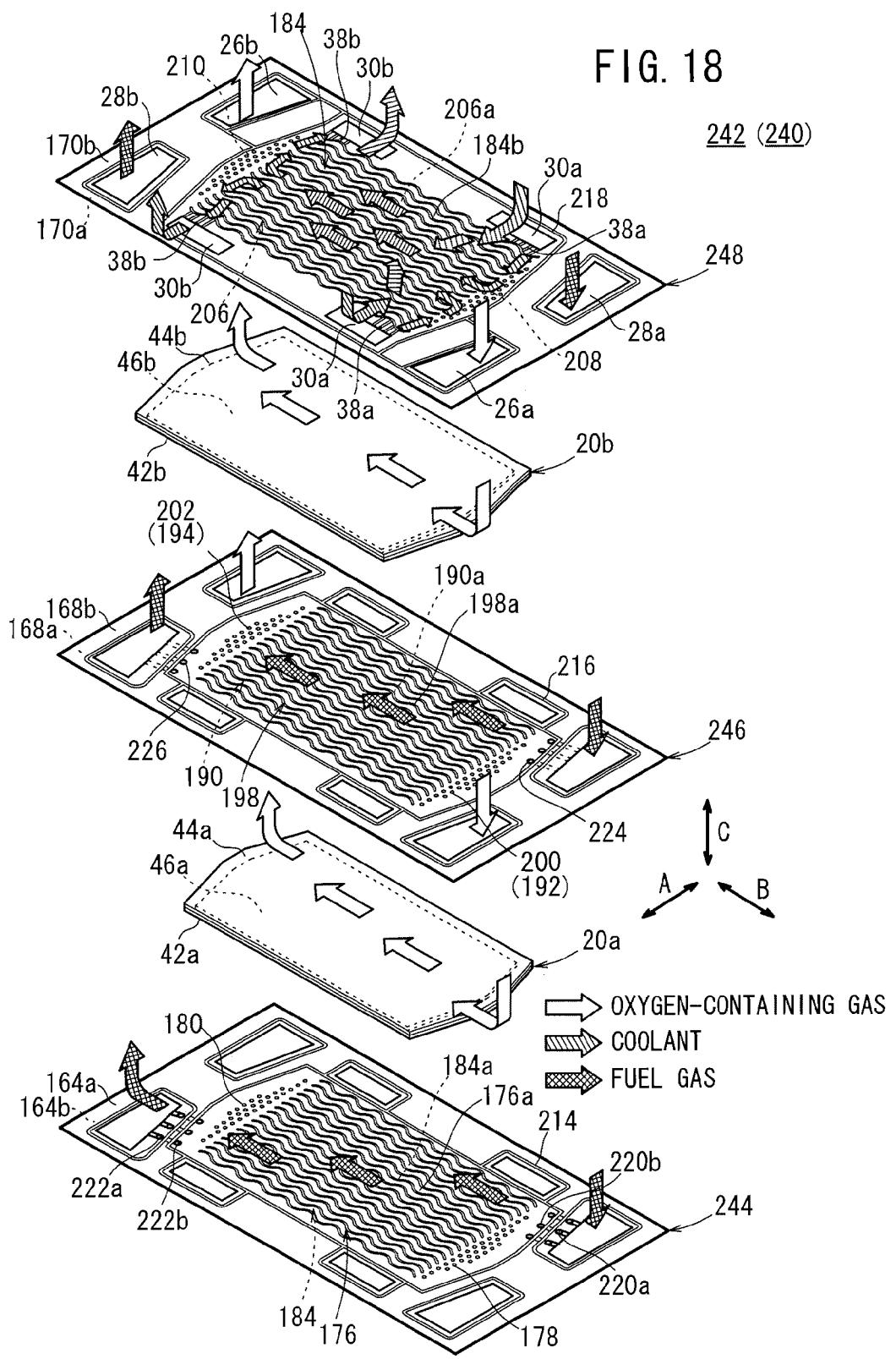
FIG. 18 is an exploded perspective view of main parts of a power generation unit of a fuel cell stack according to a ninth embodiment of the present invention.
Figure 19:
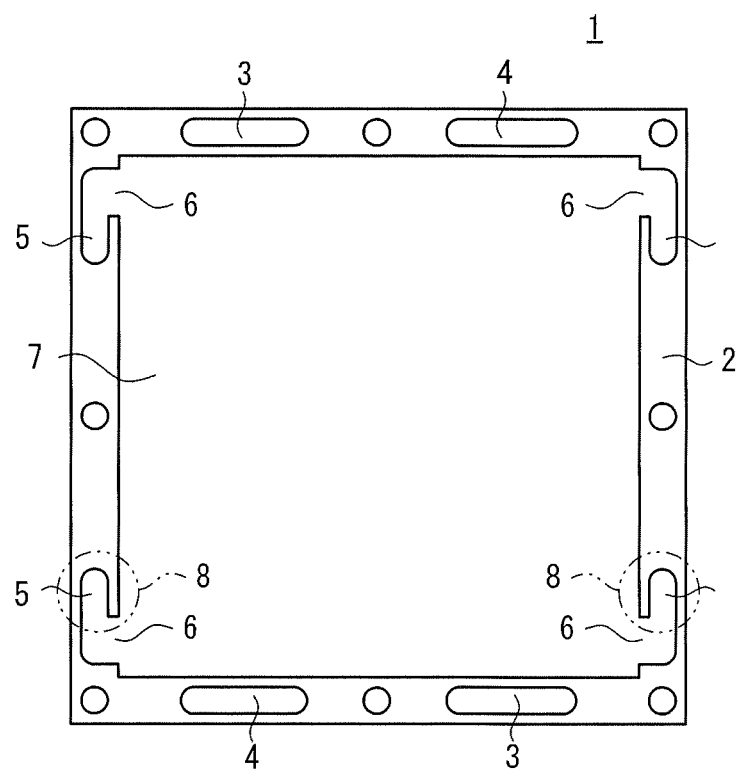
FIG. 19 is an explanatory view of a spacer disclosed in Japanese Laid-Open Patent Publication No. 2000-260439.
Figure 20:
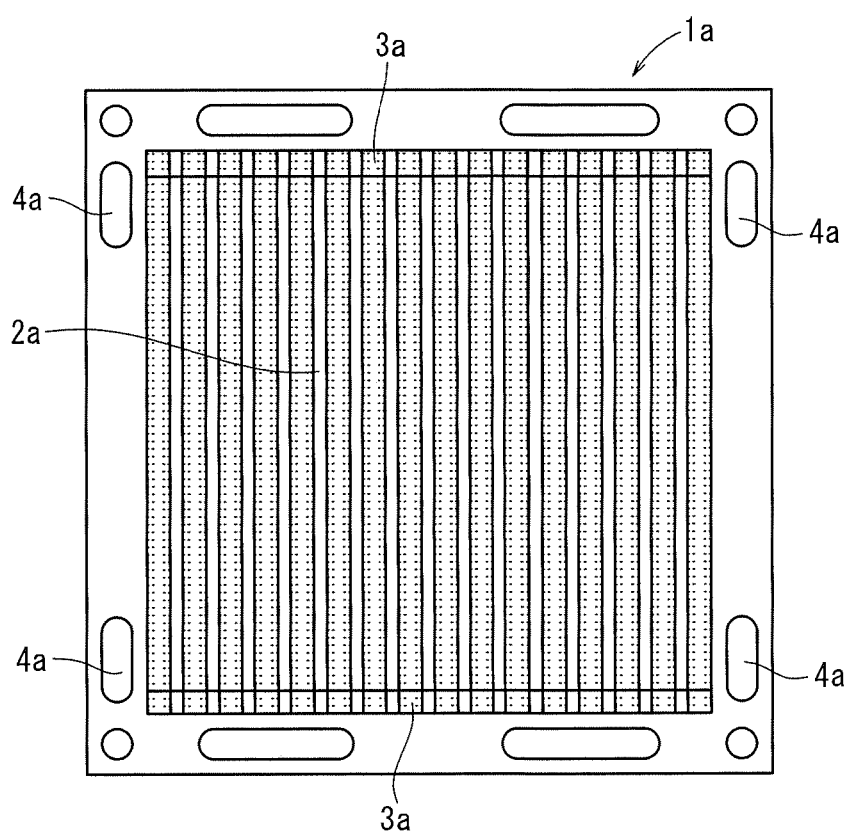
FIG. 20 is an explanatory view of a separator disclosed in Japanese Laid-Open Patent Publication No. 2000-260439.

FIG. 18 is an exploded perspective view of main parts of a power generation unit 242 constituting part of a fuel cell stack 240 according to a ninth embodiment of the present invention. Structural elements of the ninth embodiment, which are the same as those of the fuel cell stack 160 according to the eighth embodiment, are designated by like reference characters and such features shall not be described in detail.

In the power generation unit 242, the first metal separator 244, the first membrane electrode assembly 20a, the second metal separator 246, the second membrane electrode assembly 20b, and the third metal separator 248 are stacked along the direction of gravitational force (along the direction of the arrow C).

The ninth embodiment can attain the same effects as those of the first through eighth embodiments.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell stack formed by stacking electrolyte electrode assemblies and rectangular separators in a first horizontal direction, the electrolyte electrode assemblies each comprising a pair of electrodes and an electrolyte interposed between the electrodes, the fuel cell stack having first and second side portions extending in a direction of gravity at respective ends in a second horizontal direction perpendicular to the first horizontal direction, the fuel cell stack comprising:
   coolant supply passages, which extend in the stacking direction and through which a coolant flows, disposed at upper positions in the first and second side portions;
   coolant discharge passages, which extend in the stacking direction and through which a coolant flows, disposed at lower positions in the first and second side portions;
   a coolant flow field disposed between the separators and between the first and second side portions; and
   a coolant passage connecting portion, which extends in the direction of gravity and provides a direct fluid connection with one of the coolant supply passages with one of the coolant discharge passages, disposed in at least one of the first and second side portions,
   wherein the coolant supply passage is connected toward the coolant flow field for supplying the coolant to the coolant flow field in the second horizontal direction, and the coolant discharge passage is connected to the coolant flow field for discharging the coolant from the coolant flow field in the second horizontal direction, and
   the coolant passage connection portion is separate and distinct from the coolant flow field.

2. The fuel cell stack according to claim 1, wherein end plates are arranged on opposite ends in the stacking direction of the electrolyte electrode assemblies and the separators, and the coolant passage connecting portion is provided in at least one of the end plates.

3. The fuel cell stack according to claim 1, wherein end plates are arranged on opposite ends in the stacking direction of the electrolyte electrode assemblies and the separators with insulating plates interposed therebetween, and the coolant passage connecting portion is further provided in at least one of the insulating plates.

4. The fuel cell stack according to claim 1, wherein the coolant passage connecting portion is provided in at least one of the separators.

5. The fuel cell stack according to claim 4, wherein a sealing member is provided integrally or separately on each of the separators, and the coolant passage connecting portion is formed in the sealing member.

6. The fuel cell stack according to claim 1, wherein the coolant passage connecting portion includes a piping member disposed on an outer portion of at least one of the end plates, the one of the end plates being arranged on one end in the stacking direction of the electrolyte electrode assemblies and the separators.

7. A fuel cell stack formed by stacking electrolyte electrode assemblies and rectangular separators in a first horizontal direction, the electrolyte electrode assemblies each comprising a pair of electrodes and an electrolyte interposed between the electrodes, the fuel cell stack having first and second side portions extending in a direction of gravity at respective ends in a second horizontal direction perpendicular to the first horizontal direction, the fuel cell stack comprising:
 coolant supply passages, which extend in the stacking direction and through which a coolant flows, disposed at upper positions in the first and second side portions ;
 coolant discharge passages, which extend in the stacking direction and through which a coolant flows, disposed at lower positions in the first and second side portions;
 a coolant flow field disposed between the separators;
 a manifold communication passage which extends through the fuel cell stack in the stacking direction and has a direct fluid connection with the coolant supply passages; and
 a coolant passage connecting portion, which provides a direct fluid connection with the manifold communication passage and the coolant discharge passages, and which is disposed on the exterior of at least an end plate arranged on one end in the stacking direction of the electrolyte electrode assemblies and the separators,
 wherein the coolant supply passage is connected toward the coolant flow field for supplying the coolant to the coolant flow field in the second horizontal direction, and the coolant discharge passage is connected to the coolant flow field for discharging the coolant from the coolant flow field in the second horizontal direction.

8. The fuel cell stack according to claim 7, wherein the coolant passage connecting portion comprises a piping member arranged on an exterior of the end plate.

9. A fuel cell stack formed by stacking electrolyte electrode assemblies and rectangular separators, the electrolyte electrode assemblies each comprising a pair of electrodes and an electrolyte interposed between the electrodes, a coolant flow field extending in a surface direction being formed between the rectangular separators, the fuel cell stack comprising:
 a pair of coolant supply passages which are formed respectively in lengthwise sides of the rectangular separators such that the coolant supply passages face each other in the surface direction; and
 a pair of coolant discharge passages which are formed respectively in lengthwise sides of the rectangular separators such that the coolant discharge passages face each other in the surface direction,
 wherein the coolant supply passages and the coolant discharge passages are constituted by rectangular openings which are elongated along a longer side of the rectangular separators, the rectangular openings including connecting passages disposed in portions adjacent short sides of the rectangular separators, the connecting passages connecting the openings with the coolant flow field,
wherein one coolant supply passage and one coolant discharge passage are provided close to and along the same longer side of each of the rectangular separators, the same side extending in a direction of gravity in side portions of the fuel cell stack, the upper one of the coolant passages forming a coolant supply passage for supplying the coolant to a coolant flow field disposed between the separators, the lower one of the coolant passages forming a coolant discharge passage for discharging the coolant from the coolant flow field.

10. The fuel cell stack according to claim 9, wherein, in each of the rectangular openings in a rectangular separator, each of the connecting passages is disposed only within a range from an intermediate position of the rectangular opening in the longitudinal direction to an end thereof adjacent to a short side of that rectangular separator.

11. The fuel cell stack according to claim 9, wherein the rectangular separators have vertically elongated shapes and are stacked in a horizontal direction, the coolant supply passages being disposed on an upper side of the rectangular separators in a vertical direction, and the coolant discharge passages being disposed on a lower side of the rectangular separators in the vertical direction.

* * * * *